(12) United States Patent
Messih et al.

(10) Patent No.: US 7,729,829 B2
(45) Date of Patent: Jun. 1, 2010

(54) SUSPENSION IRREGULARITY DETECTING SYSTEM

(75) Inventors: David Messih, Farmington Hills, MI (US); Jianbo Lu, Livonia, MI (US); Albert Salib, Superior Township, MI (US); Erik Chubb, Chicago, IL (US)

(73) Assignee: Ford Global Technologies, Dearborn, MI (US)

( * ) Notice: Subject to any disclaimer, the term of this patent is extended or adjusted under 35 U.S.C. 154(b) by 775 days.

(21) Appl. No.: 11/532,238

(22) Filed: Sep. 15, 2006

(65) Prior Publication Data

US 2007/0067080 A1    Mar. 22, 2007

Related U.S. Application Data

(63) Continuation-in-part of application No. 10/972,973, filed on Oct. 25, 2004, which is a continuation-in-part of application No. 10/966,395, filed on Oct. 15, 2004.

(51) Int. Cl.
    *G06F 19/00* (2006.01)
(52) U.S. Cl. ............................ 701/37; 701/45; 180/282; 280/6.15; 280/5.5
(58) Field of Classification Search .................... 701/45, 701/37, 48; 280/124.16, 6.15, 755, 5.5, 5.515; 180/282
    See application file for complete search history.

(56) References Cited

U.S. PATENT DOCUMENTS

| | | | |
|---|---|---|---|
| 5,160,161 A * | 11/1992 | Tsukamoto et al. ...... | 280/5.501 |
| 5,723,782 A | 3/1998 | Bolles, Jr. | |
| 5,735,540 A * | 4/1998 | Schiffler ................... | 280/5.501 |
| 6,015,155 A * | 1/2000 | Brookes et al. .......... | 280/5.505 |
| 6,247,685 B1 | 6/2001 | Takahashi | |
| 6,302,417 B1 * | 10/2001 | Heyring ............... | 280/124.106 |
| 6,463,371 B1 | 10/2002 | Ulyanov et al. | |
| 6,711,482 B2 | 3/2004 | Shiino et al. | |
| 6,973,824 B2 | 12/2005 | Giustino et al. | |
| 7,255,358 B2 * | 8/2007 | Kim ....................... | 280/124.16 |
| 2002/0161498 A1 * | 10/2002 | Stiller et al. .................. | 701/37 |
| 2003/0055549 A1 * | 3/2003 | Barta et al. .................... | 701/70 |
| 2003/0125857 A1 * | 7/2003 | Madau et al. ................. | 701/37 |
| 2003/0130778 A1 * | 7/2003 | Hrovat et al. ................. | 701/45 |
| 2003/0204293 A1 * | 10/2003 | Shiino et al. .................. | 701/37 |
| 2004/0041358 A1 | 3/2004 | Hrovat et al. | |
| 2004/0176889 A1 * | 9/2004 | Capito ......................... | 701/37 |
| 2004/0204799 A1 * | 10/2004 | Hurley et al. .................. | 701/1 |
| 2004/0249545 A1 | 12/2004 | Lu et al. | |
| 2005/0017578 A1 * | 1/2005 | Kato et al. ................... | 303/146 |

(Continued)

*Primary Examiner*—Tuan C To
(74) *Attorney, Agent, or Firm*—Angela M. Brunetti; Fredrick Owens

(57) ABSTRACT

A vehicle suspension system (19) includes a suspension (47). A lateral acceleration sensor (32) generates a lateral acceleration signal. A roll rate sensor (34) generates a roll rate signal. A controller (26) detects an irregularity in the suspension in response to the lateral acceleration signal and the roll rate signal. A method of detecting suspension irregularities in a vehicle (10) includes the generating of a lateral acceleration signal and a roll rate signal. Roll angle is determined in response to the lateral acceleration signal and roll rate signal. A roll gradient, a roll acceleration coefficient, and a roll damping parameter are determined in response to at least the roll angle. The roll gradient, the roll acceleration coefficient, and the roll damping parameter are compared to associated nominal values. A suspension irregularity is indicated in response to the comparison.

17 Claims, 7 Drawing Sheets

U.S. PATENT DOCUMENTS

| | | |
|---|---|---|
| 2005/0065697 A1 * | 3/2005 | Niino et al. .................... 701/71 |
| 2005/0080542 A1 | 4/2005 | Lu et al. |
| 2005/0080543 A1 | 4/2005 | Lu et al. |
| 2005/0080545 A1 | 4/2005 | Takagi |
| 2005/0098401 A1 | 5/2005 | Hamilton et al. |
| 2005/0278094 A1 * | 12/2005 | Swinbanks et al. ............ 701/37 |

* cited by examiner

SUSPENSION IRREGULARITY DETECTING SYSTEM

RELATED APPLICATION

The present application is a continuation-in-part of U.S. patent application Ser. No. 10/972,973 filed on Oct. 25, 2004, which is a continuation-in-part of U.S. patent application Ser. No. 10/966,395 filed on Oct. 15, 2004. The disclosures of the stated applications are incorporated by reference herein.

TECHNICAL FIELD

The present invention relates generally to vehicle control systems, vehicle sensing systems, and suspension systems. More particularly, the present invention is related to techniques for detecting suspension system irregularities and responding thereto.

BACKGROUND

Recently, vehicle roll stability control (RSC) schemes, i.e., U.S. Pat. No. 6,324,446, have been proposed to address the issue of friction-induced rollovers. RSC system includes a variety of sensors sensing vehicle states and a controller that controls a distributed brake pressure to reduce a tire force so the net moment of the vehicle is counter to the roll direction.

During an event causing the vehicle to roll, the vehicle body is subject to a roll moment due to the coupling of the lateral tire force and the lateral acceleration applied to the center of gravity of vehicle body. This roll moment causes suspension height variation, which in turn results in a vehicle relative roll angle (also called chassis roll angle or suspension roll angle). The relative roll angle is an important variable that is used as an input to the activation criteria and to construct the feedback brake pressure command, since it captures the relative roll between the vehicle body and the axle. The sum of such a chassis roll angle and the roll angle between wheel axle and the road surface (called wheel departure angle) provides the roll angle between the vehicle body and the average road surface, which is one of the important variables feeding back to the roll stability control module.

The chassis roll angle can be calculated as in U.S. Pat. No. 6,556,908 using the lateral acceleration of the center of gravity of the vehicle body, the roll angular acceleration, and the roll angular velocity, together with vehicle-specific parameters, such as the sprung mass, the vehicle body roll moment of inertia, the roll stiffness and damping ratio of the suspensions and the anti-roll-bars, and the distance between the center of gravity of the vehicle body and the floor of the vehicle body. The disclosure of U.S. Pat. No. 6,556,908 is hereby incorporated by reference.

One problem with using these parameters in determining relative roll angle is that the variables may vary with vehicle operating conditions. For example, a 150 pound roof loading for a typical SUW with a curb weight of 5000 pounds may cause more than 30% error in relative roll angle calculations if computed assuming no roof load. From the vehicle mass point of view, although a 150 pound roof loading accounts for only a 3% mass variation over the vehicle curb weight, it could account for a 30% error in the chassis roll computation, which is ten times larger. If the above parameters are fixed at certain nominal values in the RSC system, it is conceivable that optimal control performance may not be achieved under a different loading condition. For example, if the relative roll angle is computed with nominal vehicle loading condition assumptions, without considering roof loading, the relative roll angle may be under estimated for vehicles with roof loadings, which results in a reduced control. That is, the control system may not be as effective as desired. On the other hand, if the relative roll angle is computed with maximum roof loading, it may be over estimated for vehicles without roof loadings causing unintended control. That is, the control system may become too sensitive or intrusive. Therefore, in order to improve the overall performance of the RSC system, it may be desirable to estimate and update the vehicle parameters periodically or adaptively adjust in real time based on the detected vehicle loading.

Certain schemes for obtaining vehicle parameters have been disclosed. For example, in U.S. Pat. No. 4,548,079, a method is disclosed for determining vehicle mass directly using engine output torque and vehicle acceleration. Similarly, in U.S. Pat. No. 5,490,063, push force is determined from the driveline torque and gear ratio to obtain vehicle mass. In U.S. Pat. No. 6,167,357, instead of calculating vehicle mass directly, a recursive least square (RLS) algorithm is proposed to estimate both vehicle mass and aerodynamic coefficient online. The latter method is considered to be more reliable since it recursively adjusts for estimation error of the previous estimates. Furthermore, the use of vehicle acceleration, which is usually very noisy, is avoided. Notice that the mass estimation schemes proposed in the above-cited patents may not accurately indicate changes to parameters that impact the roll dynamics of the vehicle. For example, a 150 pound roof loading on a 5000 pound SUV, i.e., 3% mass change, might be undetectable in the above schemes due to the potential error in the engine torque, which usually is much larger than 3%. Other error sources include the road grade, the tire rolling radius change due to tire pressure drop and due to the vehicle loading variations and the vehicle drag.

The above schemes focus mainly on large mass variations, which may have significant influences on the vehicle longitudinal dynamics and vehicle fuel consumption. The above schemes do not determine the vehicle parameters related to the vehicle's roll dynamics, such as the roll stiffness, the roll inertia, and the roof loading.

The aforementioned schemes do not determine the suspension operating errors or irregularities. Suspension irregularities occur frequently and may, for example, be due to aging of a suspension component, excessive usage of suspension components on bumpy roads, and excessive wear of moving parts used in the suspension components.

When the irregularity in a suspension damper happens, vehicle handling suffers, and tires and suspension components are prone to large sustained motions, which further cause those components to wear abnormally. Such irregularity also reduces vehicle ride comfort and degrades cornering ability of the vehicle, as well as vehicle stopping distances. Since most vehicle stability control systems are designed based on the nominal suspension system setup, the reduced suspension damping ratio also deteriorates the stability control performance. For example, an irregularity in suspension dampers for a vehicle that is equipped with a roll stability control system might lead to a longer period of roll bouncing, i.e., the vehicle body roll vibrates with large magnitudes during a potential rollover event.

Thus, there exists a need for an improved vehicle suspension system or roll stability system that accounts for such irregularities.

SUMMARY OF THE INVENTION

The present invention provides an indirect method to detect suspension irregularities. In one embodiment, suspension damper abnormal conditions are detected through the use of motion sensors via a roll stability control system.

Another embodiment of the present invention provides a vehicle suspension system that includes a suspension. A lateral acceleration sensor generates a lateral acceleration signal. A roll rate sensor generates a roll rate signal. A yaw rate sensor generates a yaw rate signal. A longitudinal accelerometer generates a longitudinal acceleration signal. A controller detects an irregularity in suspension dampers in response to the stated signals.

Yet another embodiment of the present invention provides a method of detecting suspension damping irregularities in a vehicle through identifying the mathematical characterization of suspension damping in roll direction, i.e., the roll damping parameter. The method includes generating a lateral acceleration signal, a roll rate signal, roll acceleration signal, and other calculated signals. The vehicle roll dynamics is characterized through the suspension roll angle or relative roll angle, which is related to the roll angle calculated based on a modified roll rate signal during certain dynamic conditions. A roll gradient and a roll acceleration coefficient may be determined with the roll damping parameter in response to the vehicle roll motion. Dampening irregularity may be determined based on the roll damping parameter, which is affected by the roll gradient and the roll acceleration coefficient. The stated three parameters may be determined simultaneously including comparing the roll damping parameter with a nominal value. When the roll damping parameter is significantly smaller than the nominal value, then at least one suspension has a damping irregularity.

The embodiments of the present invention provide several advantages. One advantage provided by an embodiment of the present invention is the ability to detect suspension irregularities without use of additional hardware. Such detection and the information associated therewith is useful in adjusting vehicle characteristics, such as braking characteristics, steering characteristics, and suspension system characteristics to prevent and mitigate a vehicle roll situation. Such information is also useful to provide a warning signal to the driver of the vehicle indicating that one or more of the vehicle suspension components need to be repaired or replaced to restore a desired ride comfort and handling performance level. Maintaining a vehicle with a desired damping level allows for operation safety maintenance of a vehicle. When suspension dampers are degraded or have an irregularity excessive vehicle roll and pitch motions and weight transfers can occur, which further reduces the amount of tire contact with a road surface. Reduced road surface tire contact increases difficulty in safely cornering and braking a vehicle.

The present invention also uses the suspension irregularity information to adjust the vehicle chassis controls to improve the performance of vehicle active systems.

The present invention provides the above-stated advantages without the need for additional hardware, such as suspension height sensors, controllable damper specific sensors, tire patch load sensors, and other known hardware commonly utilized.

Other advantages and features of the present invention will become apparent when viewed in light of the detailed description of the preferred embodiment when taken in conjunction with the attached drawings and appended claims.

DETAILED DESCRIPTION

Figure 1:
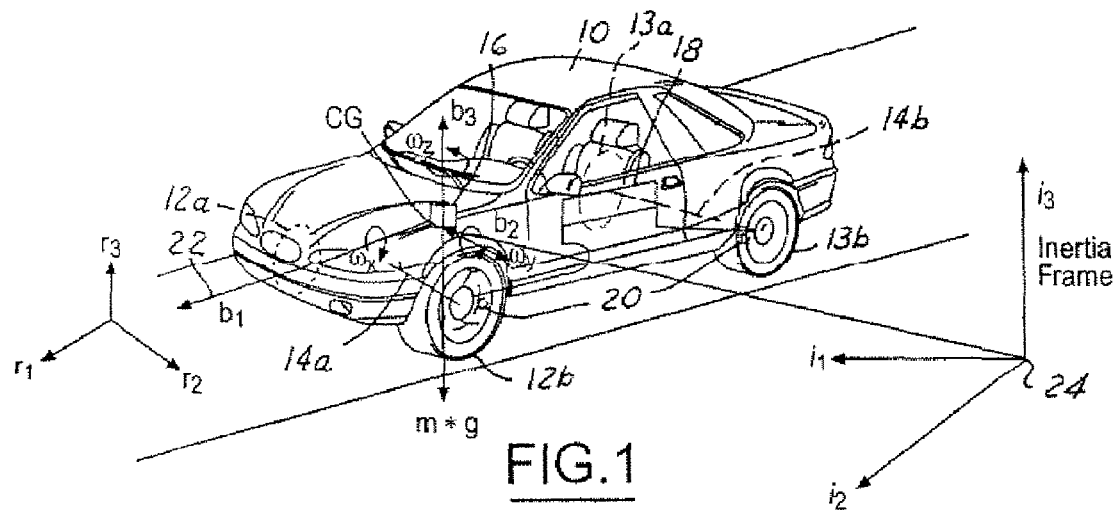
FIG. 1 is a diagrammatic view of a vehicle with variable vectors and coordinate frames according to the present invention.

A vehicle suspension system is designed to support weight, absorbs and dampens shock and vibration of the vehicle body and the wheels, and helps maintain a good contact between the tire and the road surface. A vehicle suspension system consists of three components: springs, dampers, and anti-sway bars.

The suspension springs in the suspension system hold up the weight of the vehicle and help the vehicle body to resist the so-called pitch motion (front-to-rear angular motion) and roll motion (side-to-side angular motion) thereof. The suspension springs may be in the form of coil springs, leaf springs, or air springs and include torsion bars. The physical characterization of the suspension springs is their stiffness, which is the force per unit displacement of the suspenion height, that affects how the vehicle body responds while the vehicle is being driven on a road. For low stiffness springs, such as those used in luxury cars, the vehicle body does not easily respond to "swallow" road bumps and potholes and provide a smooth ride. However, the vehicle equipped with such low stiffness springs could experience large dive and squat during braking or acceleration and body sway or roll during cornering. The vehicles equipped with high stiffness springs, such as those used in sports cars, respond sensibly to the road bumps and potholes, but generate minimal body motion during aggressive cornering. Metal springs usually do not deteriorate drastically due to aging, wear, or excessive usage. For this reason, it is assumed that the suspension spring stiffness is approximately constant.

The suspension anti-roll bars are used with the other suspension components to reduce the sway or roll motion of the vehicle. The anti-roll bars are usually metal rods, which span the entire axle and effectively join the left and right sides of suspension together. If one side of a wheel at an axle equipped with anti-roll bar moves, the anti-roll bar reduces that motion by simply transferring some of the motion to the opposite wheel of the same axle. In this way, the vehicle body roll motion during cornering is reduced. Notice that the anti-roll bars are more like suspension springs, but they are designed to counteract to the vehicle roll motion only. Its mathematical characterization is the vehicle's roll stiffness portion due to the anti-roll bar. In this invention disclosure, we assume the anti-roll bar roll stiffness does not vary much with respect to aging or usage.

Suspension dampers are used for eliminating unwanted and excessive motion in vehicle body and wheels. Suspension dampers are the primary suspension components that actually help "absorb shock", i.e., prevent continued bounce each time the vehicle is accelerated, stopped, cornering, or hits a bump. For this reason, they are also called "shock absorbers". They are designed to slow and reduce bounces to help control the vehicle weight during transitions and to aid or support tire functions.

A suspension damper can be envisioned as an oil pump that is placed between the frame and wheels of a vehicle. The upper mount of the damper connects to the vehicle body through its frame, while the lower mount connects to the axle, near the wheel. When the wheel encounters a bump in the road, the energy of the spring is transferred to the damper through the upper mount, down through the piston rod, and into the piston. Orifices perforate the piston and allow fluid to leak through as the piston moves up and down in the pressure tube. Because the orifices are relatively tiny, only a small amount of fluid, under high pressure, passes through the orifices. This develops the hydraulic friction necessary to dissipate the energy generated from the unwanted and excessive motion, such as pitch and roll body motion, and the excessive wheel motion. Without suspension dampers, the vehicle body would vibrate, i.e., bounce up and down on the road for an extended period of time. Also, without the damper, the tires would lack adhesion, which would degrade braking and vehicle cornering. For this reason, the suspension dampers aid in providing vehicle stability and safety.

The mathematical characterization of a damper is referred to as the damping coefficient or damping ratio, which has a value that is lower when less unwanted motion is dissipated. The irregularity in the dampers usually generates a damping ratio less than the desired nominal value. When an irregularity, such as a damper wear or a damper leak due to aging or excessive usage, occurs, the damper's resistance to movement weakens hence the damper experiences a low damping ratio.

Thus, there is a need to conduct a real time determination of the suspension damper irregularity, and to use such information to warn the driver and to adjust the vehicle stability control thresholds. While the suspension irregularity might be directly measured through additional hardware such as the suspension height sensors, controllable damper specific sensors, tire patch sensors, etc., this invention disclosure proposes an indirect method which uses motion sensors equipped with a roll stability control system.

In the following figures, the same reference numerals will be used to identify the same components. The present invention may be used in conjunction with a roll stability control system for a vehicle. The present invention may also be used with a deployment device such as an airbag or active roll bar. The present invention will be discussed below in terms of preferred embodiments relating to an automotive vehicle moving in a three-dimensional road terrain. The present invention is described with respect to determining the parameters related to the roll dynamics of the vehicle body, such as an added mass and height of the mass, the roll moment of inertial, and the roll damping parameter. The roll damping parameter is a composite parameter, which is related to the damping ratios of the suspension dampers. When at least one suspension damper experiences an abnormal condition, such as leaking or excessive wear, the composite roll damping parameter varies. Therefore, the roll damping parameter of the vehicle may be used to detect when there is an irregularity in the suspension dampers.

As will be described below, the value of the roll damping parameter is determined simultaneously with the roll gradient and the roll acceleration coefficient, which are further affected by the roof loading. Also notice that the roll dynamics characterization, such as the roll gradient, the roll acceleration coefficient, and the roll damping parameter are determined from the motion sensors when the dynamics of the vehicle and the driven road satisfy certain conditions. Such values may be referred to as an "adaptive" roll gradient, an "adaptive" roll acceleration coefficient, an "adaptive" roll moment of inertia, and an "adaptive" roll damping parameter. The various roll parameters may be referred to as adaptively determined, meaning that such values may change due to a changing mass or load over time and/or a changing suspension damper. That is, such values are not fixed. These roll condition parameters may be iteratively determined. That is, the values may be updated as the vehicle is running or driving. The values may then be averaged.

It should also be noted that while one of the roll gradient, roll acceleration coefficient, and roll damping parameter may be adaptively determined, the vehicle loading and the height of the loading may be determined from the above three adaptive parameters.

Referring to FIG. 1, an automotive vehicle 10 with a safety system of the present invention is illustrated with the various forces and moments thereon during a rollover condition. Vehicle 10 has front right ($FR_W$) and front left ($FL_W$) wheel/tires 12A and 12B and rear right ($RR_W$) wheel/tires 13A and rear left ($RL_W$) wheel/tires 13B, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

The sensing system 16 is coupled to a control system 18. The sensing system 16 may comprise many different sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor and a longitudinal accelerometer. The various sensors will be further described below. The sensors may also be used by the control system in various determinations such as to determine a wheel lifting event, determine a height and position of a mass, etc. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x, y, and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame 22 as described below.

The angular rate sensors and the accelerometers may be mounted on the vehicle body along the body frame directions $b_1$, $b_2$, and $b_3$ which are the x-y-z axes of the sprung mass of the vehicle.

The longitudinal acceleration sensor is mounted on the car body located at the center of gravity, with its sensing direction along $b_1$ axis, whose output is denoted as $a_x$. The lateral acceleration sensor is mounted on the car body located at the center of gravity, with its sensing direction along $b_2$ axis, whose output is denoted as $a_y$.

The other frame used in the following discussion includes the road frame, as depicted in FIG. 1. The road frame system $r_1r_2r_3$ is fixed on the driven road surface, where the $r_3$ axis is along the average road normal direction computed from the normal directions of the four-tire/road contact patches.

In the following discussion, the Euler angles of the body frame $b_1b_2b_3$ with respect to the road frame $r_1r_2r_3$ are denoted as $\theta_{xbr}$ and $\theta_{ybr}$, which are also called the relative Euler angles (i.e., relative roll and relative pitch angles, respectively).

Figure 2:
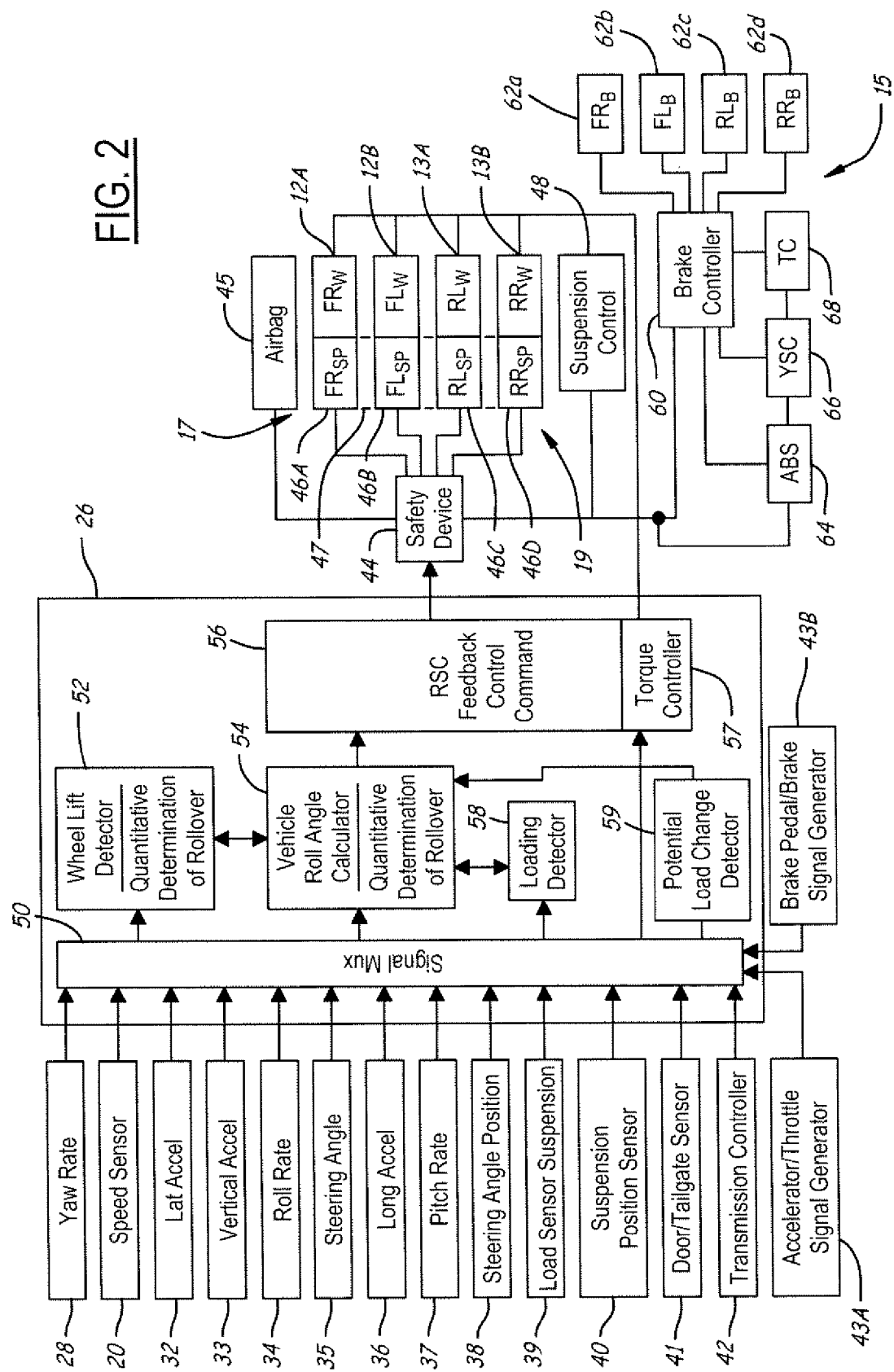
FIG. 2 is a block diagram of a stability system according to the present invention.

Referring now to FIG. 2, roll stability control system 18 is illustrated in further detail having a controller 26, multiple active systems, and various sensors. The active systems may include a brake control system 15, a steering control system 17, and a suspension control system 19. The sensors may include a yaw rate sensor 28, a speed sensor 20, a lateral acceleration sensor 32, a vertical accelerometer sensor 33, a roll angular rate sensor 34, a steering wheel (hand wheel) angle sensor 35, a longitudinal acceleration sensor 36, a pitch rate sensor 37, steering angle (of the wheels or actuator) position sensor 38, a suspension load sensor 39, a suspension position (height) sensor 40, a door/tailgate sensor 41, a transmission controller 42, a accelerator/throttle signal generator 43A and a brake pedal/brake signal generator 43B. It should be noted that various combinations and sub-combinations of the above sensors may be used.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-43B may be used in a commercial embodiment. Safety device 44 may control an airbag 45 or a steering actuator 46A-46D at one or more of the wheels 12A, 12B, 13A, 13B of the vehicle.

The suspension system 19 includes a suspension control 48, a suspension 47, and suspension adjusting elements 46A-46D ($FR_{SP}$, $FL_{SP}$, $RR_{SP}$, $RL_{SP}$) that are associated with each wheel. The suspension control 48 and adjusting elements 46A-46D may be used to adjust the suspension to prevent rollover. The adjusting elements 46A-46D may include electrically, mechanically, pneumatically, and/or hydraulically operated actuators, adjustable dampners, or other known adjustment devices, and are described below in the form of actuators.

The controller 26, the suspension control 48, and the brake controller 60 may be microprocessor based such as computers having central processing units, memories (RAM and/or ROM), and associated input and output buses. The controller 26, the suspension control 48, and the brake controller 60 may be in the form of application-specific integrated circuits or may be formed of other logic devices known in the art. The controller 26, the suspension control 48, and the brake controller 60 may be a portion of a central vehicle main control unit, an interactive vehicle dynamics module, a restraints control module, a main safety controller, a control circuit having a power supply, combined into a single integrated controller, or may be stand-alone controllers, as shown.

Roll angular rate sensor 34 and pitch rate sensor 37 may sense the roll condition or the wheel lifting condition of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 34 may also use a combination of sensors such as proximity sensors to make a roll rate determination.

Roll rate sensor 34 and pitch rate sensor 37 may also sense the roll condition or the wheel lifting condition based on sensing the linear or rotational relative displacement or displacement velocity of one or more of the suspension chassis components. This may be in addition to or in combination with suspension position sensor 40. The suspension position sensor 40, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or the wheel lifting condition may also be sensed by sensing directly or estimating the force or torque associated with the loading condition of one or more suspension or chassis components including a pressure transducer in an active air suspension, a shock absorber sensor such as a load sensor 39, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor. The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Controller 26 may include a signal multiplexer 50 that is used to receive the signals from the sensors 28-43B. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. The RSC feedback command 56 may include a torque controller 57. Vehicle roll angle calculator 54 is described in U.S. Provisional Applications 60/400,376 and 60/400,172, and in U.S. patent application Ser. No. 10/459,697, the disclosures of which are incorporated herein by reference.

A loading detector 58 may also be included in controller 26. The loading detector 58 may be used to determine an additional mass of the vehicle and a distance of the mass as will be described below.

A potential load change detector 59 may also be included in controller 59. The potential load change detector 59 may qualitatively determine if there was a potential change in load for the vehicle. If the vehicle has stopped (from speed sensor 20) and a door/tailgate sensor indicates the door was opened, the load may have changed. Further the longitudinal acceleration may be compared to the estimated driveshaft torque. The driveshaft torque may be estimated by the engine or transmission controller 42. Suspension height changes may also indicate the load has changed. This may be obtained using the suspension position sensor 40. The load change may be directly observed at the load sensor 39, if the vehicle is so equipped. Transmission shifting changes depending on the load. Therefore, the transmission controller may output a signal indicating a changed load. The throttle movement from the accelerator pedal or actual throttle itself may be determined at the throttle signal generator 43A. The brake signal generator may generate a braking signal. By looking at the trend (more or less force or shorter or longer duration) a load may be determined.

The vehicle dynamic sensors 32-34 and 36-37 may be located at the center of gravity of the vehicle. Those skilled in the art will recognize that the sensor may also be located off the center of gravity and translated equivalently thereto.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 23 through 43B, controller 26 determines a roll condition and/or wheel lift and controls the steering position, braking of the wheels, and/or suspension characteristics, such as wheel lift and dampening.

Safety device 44 may be coupled to a brake controller 60. Brake controller 60 controls the amount of brake torque at a front right brake 62a, front left brake 62b, rear left brake 62c and a rear right brake 62d ($ER_B$, $FL_B$, $RR_B$, $RL_B$). Other safety systems such as an antilock brake system 64, a yaw stability control system 66 and a traction control system 68 may also benefit from the knowledge of the roll gradient, roll rate parameter, roll acceleration coefficient, additional mass and position of the mass. This information may impact the control strategy such as modifying the brake force.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 39 may be a load cell coupled to one or more suspension components. By measuring the stress, strain or weight on the load sensor a shifting of the load can be determined.

The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module by using the roll rate and lateral acceleration sensor signals. If both the relative roll angle and the wheel departure angles are large enough, the vehicle may be in either single wheel lifting or double wheel lifting. On the other hand, if the magnitude of both angles is small enough, the wheels are likely all grounded. In case that both of them are not small and the double wheel lifting condition is detected or determined, the sum of those two angles will be used by the feedback control module to compute the desired actuation command for achieving rollover control performance.

The roll condition of a vehicle can be characterized by rolling radius-based wheel departure roll angler which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition can be further differentiated based on the chassis roll angle computation, i.e., in low mu surface, the chassis roll angle is usually very small. Hence, an accurate determination of chassis roll is desired.

The roll condition of the vehicle can be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. Hence, an accurate determination of chassis roll and pitch angles is desired.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of a vehicle can be characterized by the chassis roll angle itself, i.e., the relative roll angle $\theta_{xr}$ between the vehicle body and the wheel axle. If this chassis roll angle is increasing rapidly, the vehicle might be on the edge of wheel lifting or rollover. Small magnitude of this angle indicates the wheels are not lifted or are all grounded. Hence, an accurate determination of the chassis roll angle is beneficial for determining if the vehicle is in non-rollover events.

The roll condition of a vehicle can also be characterized by the roll angle between the wheel axle and the average road surface, this is called wheel departure angle. If the roll angle is increasing rapidly, the vehicle has lifted wheel or wheels and aggressive control action needs to be taken in order to prevent the vehicle from rolling over. Small magnitude of this angle indicates the wheels are not lifted.

The center of gravity C is also illustrated with nominal mass M. A roll axis is also illustrated at a distance D from the center of gravity. The symbol $a_y$ is the lateral acceleration.

Figure 3:
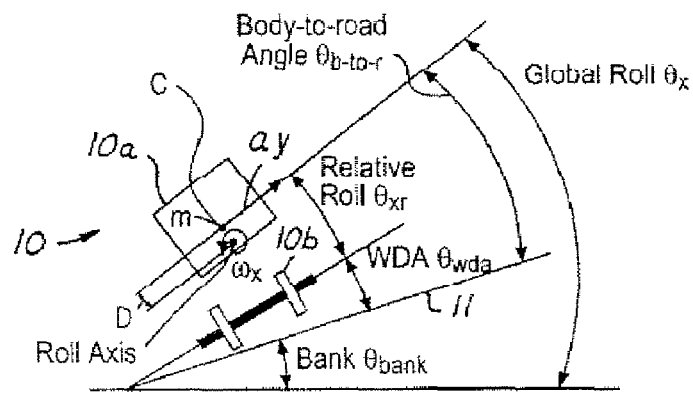
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the relative roll angle generated from a linear roll dynamics of a vehicle (see U.S. Pat. No. 6,556,908 which is incorporated by reference herein), from the calculated global roll angle (as one in U.S. Pat. No. 6,631,317, which is incorporated by reference herein). If all things were slowly changing without drifts, errors or the like, the linear bank angle and reference road bank angle terms would be equivalent.

Figure 4:
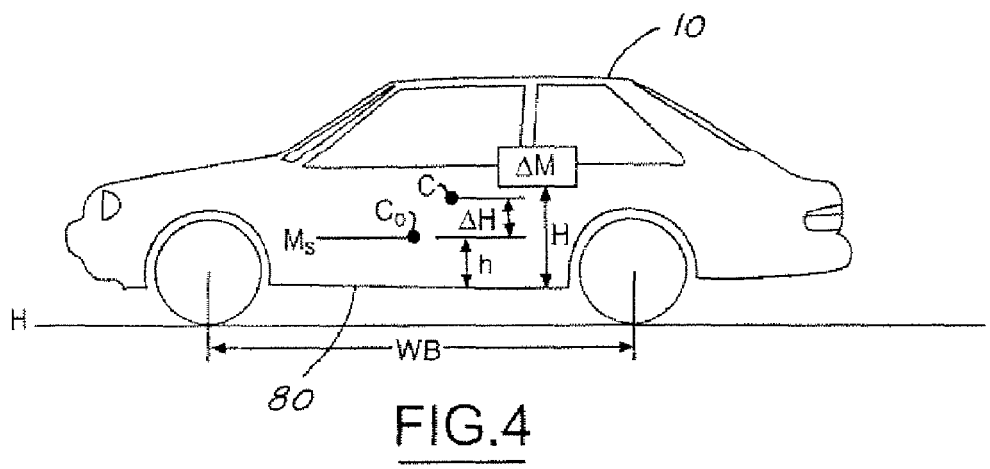
FIG. 4 is a side view of an automotive vehicle illustrating various variables thereon.
Figure 5:
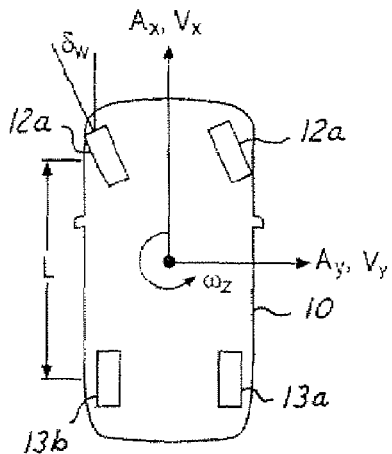
FIG. 5 is a top view of an automotive vehicle having variables used in the following calculations thereon.

Referring now to FIGS. 4 and 5, an automotive vehicle 10 is illustrated with various parameters illustrated thereon. A change in mass $\Delta M$ is illustrated relative to nominal center of gravity $C_0$. The center of gravity moves to C when the mass $\Delta M$ is added to the vehicle. The change in mass or load $\Delta M$ is positioned at a distance H above the load floor 80. The nominal center of gravity $C_0$ is located at position h above the load floor 80. The distance between the new center of gravity and the nominal center of gravity $C_0$ is $\Delta H$.

The longitudinal acceleration is denoted by $a_x$ whereas the longitudinal velocity is denoted $v_x$. The lateral acceleration and lateral velocity is denoted by $a_y$ and $v_y$ respectively. The steering wheel angle is denoted by $\delta_w$. The wheelbase of the vehicle is denoted by b.

Figure 6:
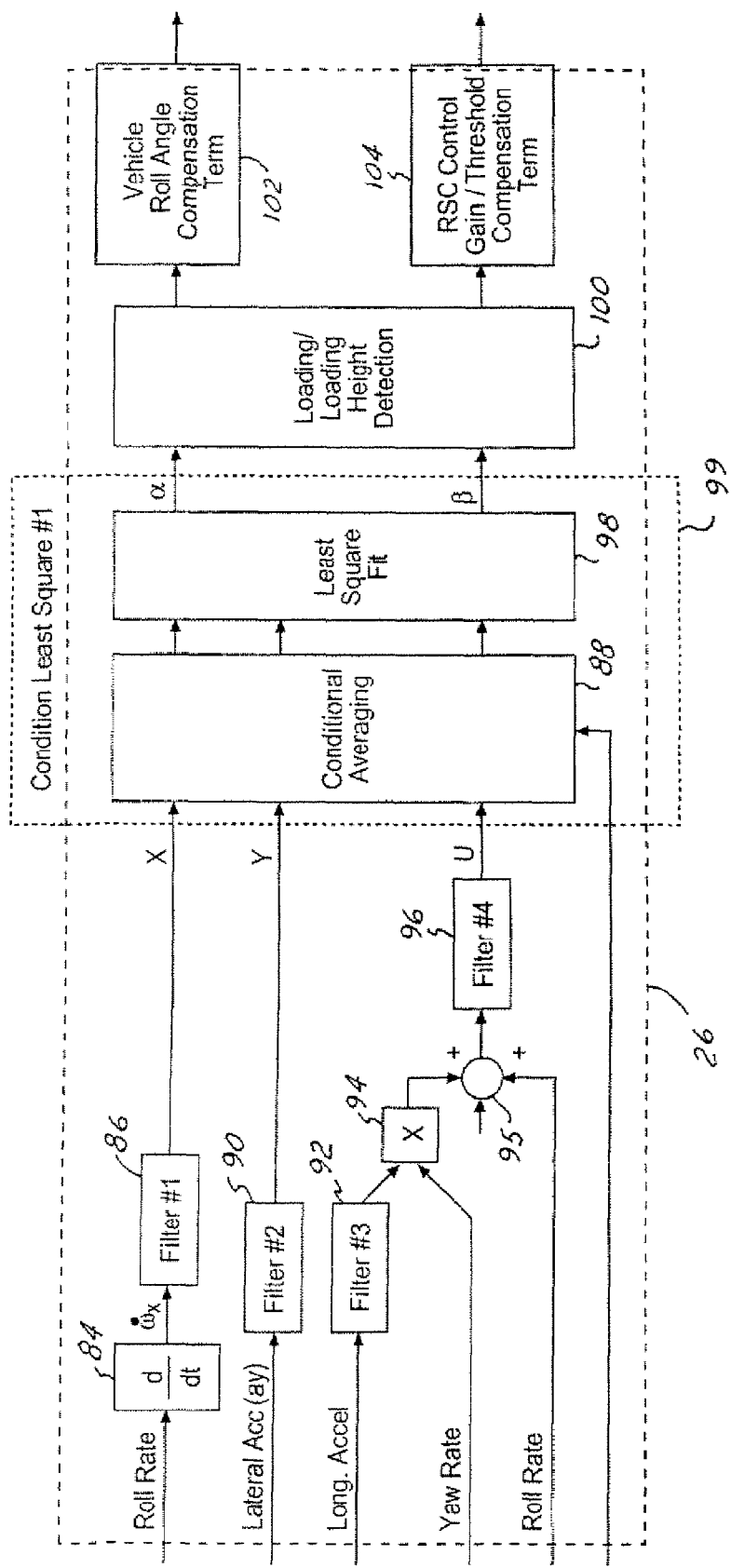
FIG. 6 is a block diagrammatic view of a controller according to a first embodiment of a least square method of the present invention.

Referring now to FIG. 6, controller 26 is illustrated in further detail. Controller 26 receives the various sensor signals, for example, the roll rate, lateral acceleration, longitudinal acceleration and yaw rate from the respective sensor measurements. From the sensor signals, the loading height and the amount of loading, the roll gradient, roll damping parameter, roll acceleration coefficient and roll inertia may be determined. These terms may be used to generate a vehicle roll angle compensation term and a roll stability control gain/threshold compensation term. Instead of determining the load and height of the load, an adaptive roll acceleration coefficient and an adaptive roll gradient that inherently have the load and height of the load therein may be determined. As mentioned above, these values in prior systems were fixed without regard to loading. Here they are adaptively determined to correspond to the loading condition. For example, these terms may increase the sensitivity of the system due to a higher center of mass. As will be further described below, the controller uses the roll rate signal and performs a derivative in box 84 to generate the roll acceleration signal $\dot{\omega}_x$, which is then filtered by the first filter 86 to generate the variable X, which is provided to a conditionality averaging box 88. The lateral acceleration signal is filtered in the second filter 90 and provided to the conditionality averaging box 88 illustrated as Y. The longitudinal acceleration is filtered in the third filter number 92 and provided to conditionality averaging box 88. As will be further described below, the conditional averaging box generates signals that are coupled to a least squares fit determination 98 which provides variables $\alpha$ and $\beta$. The variables $\alpha$ and $\beta$ are provided to a loading/loading height detection block 100. The conditional averaging block and least squares fit block 98 illustrate a first conditional least square method illustrated by box 99. The loading/loading height detection block 100 generates a vehicle roll angle compensation term 102 and an RSC control gain/threshold compensation term 104.

Figure 7:
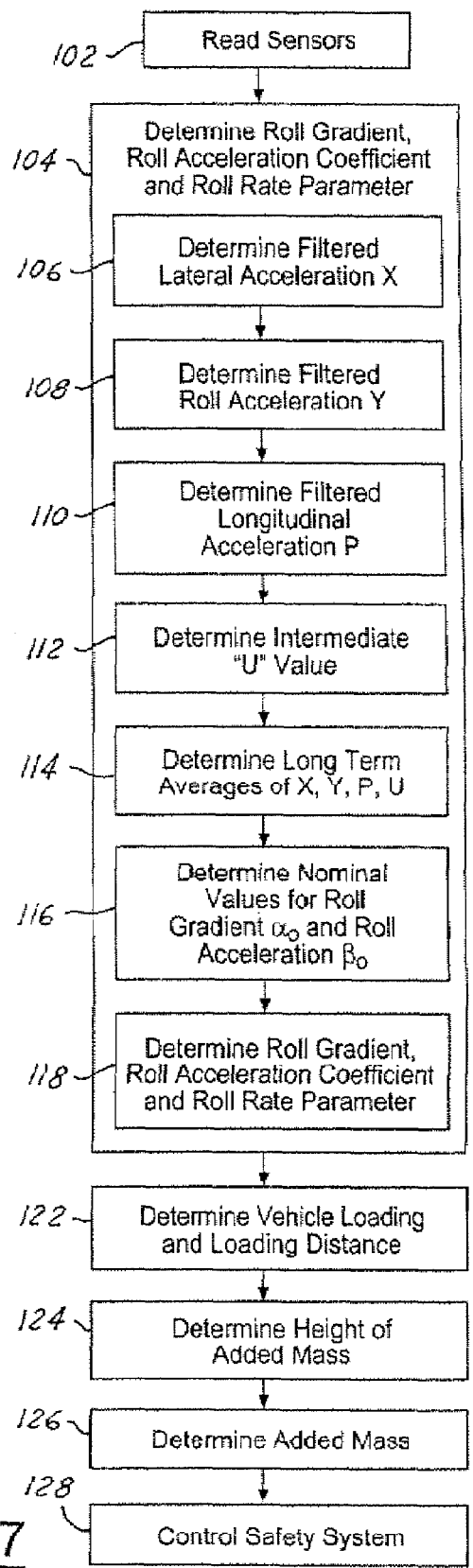
FIG. 7 is a flowchart of a method of operating the present invention.

Referring now to FIG. 7, the operation of the controller 26 is described in further detail. In step 102, the various sensors such as the roll rate sensor, the lateral acceleration sensor, longitudinal acceleration sensor and yaw rate sensor are read.

The roll signal for control is calculated as the $(\theta_x - \theta_{refbank})$, i.e., the subtraction of the reference bank angle from the global roll angle. The roll signal for control may be used to control the roll stability control system or other system or device.

As mentioned above, the various errors may enter into the various signals at various times. Thus, in certain situations the wheel departure angle or the reference bank angle may not be accurate. The following description describes how these values can be updated in response to wheel lift/wheel grounded values.

In step 104, the roll gradient, roll acceleration coefficient computation and a roll damping parameter are determined.

There are two roll angle computations used in the roll stability control: one is the relative roll angle as computed in U.S. Pat. No. 6,556,908 and the other is the global roll angle computation as computed in U.S. Pat. No. 6,631,317. U.S. Pat. Nos. 6,556,908 and 6,631,317 are incorporated by reference herein. The relative roll angle is a function of the lateral acceleration $a_y$, the roll acceleration $\dot{\omega}_x$, the roll rate $\omega_x$, the roll gradient a and the roll acceleration coefficient $\beta$ and a roll damping coefficient $\eta$. That is, $$\theta_{xr} = f(a_y, \dot{\omega}_x; \alpha, \beta, \eta, \omega_x) \quad (1)$$

In z-transformation, $$\theta_{xr} = \alpha T_{roll}(z) a_y - \beta T_{roll}(z) \dot{\omega}_x \quad (2)$$

where $T_{roll}(z)$ is a filter which reflects the linear roll model of the vehicle, i.e., it includes the roll stiffness and damping effect due to suspension dynamics. Based on the roll dynamics, the following equation holds true.

$$\theta_{xr} + \frac{D_{roll}}{K_{roll}} \dot{\theta}_{xr} = \alpha a_y + \beta \dot{\omega}_x \quad (3)$$

Performing a Laplace transform, equation 3 can be converted to the frequency domain, which leads to equation 4, $$\theta_{xr}(s) = T_{Roll}(s)(\alpha a_y(s) + \beta \dot{\omega}_x(s)) \quad (4)$$

where the transfer function $T_{Roll}$ is as shown in equation 5, $$T_{Roll}(s) = \frac{1}{1 + \eta s} \quad (5)$$

with the roll damping parameter $\eta$ as defined by equation 6.

$$\eta = \frac{D_{roll}}{K_{roll}} \quad (6)$$

Using the algorithm shown in U.S. Pat. No. 6,631,317, the global roll angle $\theta_x$ (the roll angle of the vehicle body with respect to sea level) can be obtained through an anti-drift integration of the Euler roll angle velocity (which is different from the roll angular rate) and a roll reference signal through a steady-state recovery filter. On level ground when the vehicle does not have wheels in the air, such a calculated global roll angle is the same as the chassis roll angle when the vehicle roll dynamics is within its linear range (for example, the cornering acceleration of the vehicle is under 0.35 g).

Therefore, on level ground when the vehicle does not have wheels in the air and the vehicle has moderate cornering acceleration, the algorithm used to compute global roll angle as in U.S. Pat. No. 6,631,317 is a function of the roll rate $\omega_x$, the yaw rate $\omega_z$, the relative roll angle $\theta_{xr}$ and the relative pitch angle $\theta_{yr}$ as shown by expression 7.

$$\theta_x = g(\omega_y, \omega_z, \theta_{xr}, \theta_{yr}) \quad (7)$$

In z-transformation, such a computation can be expressed as in equation 8.

$$\theta_x = T_{adi}(z)[\omega_x + \omega_z \theta_{yr}] + T_{ssc}(z)\theta_{xr} \quad (8)$$

where $T_{ssc}(z)$ is the so-called steady-state recovery filter, which is used to recover the good low frequency portion of the roll angle removed by the anti-drift-integration filter $T_{adi}(z)$. The anti-drift-integration filter $T_{adi}(z)$ compensates for computed angle drift, which can be caused from a constant offset of a roll sensor. Here the relative roll angle (chassis roll angle) $\theta_{xr}$ is used to recover the true steady state value of the roll angle.

Notice that on level ground if the vehicle is driven without wheel lifting and with moderate cornering acceleration, the relative roll angle and the global roll angle are equal. Therefore, from equations 1 and 7 or 2 and 8, the relationships between the roll gradient a, the roll acceleration coefficient $\beta$, and the roll damping parameter $\eta$ may be found.

When the suspension dampers are normal, the roll damping parameter can be assumed to be constant. In this case, the computation of the roll gradient $\alpha$ and the roll acceleration coefficient $\beta$ is the main focus.

Substituting equation 2 into equation 8, equation 9 is obtained, $$\theta_x = T_{adi}(z)[\omega_x + \omega_z \theta_{yr}] + \alpha T_{ssc}(z) T_{roll}(z) a_y - \beta T_{ssc}(z) T_{roll}(z) \dot{\omega}_x \quad (9)$$

where the relative pitch $\theta_{yr}$ is a function of the longitudinal acceleration and the pitch acceleration as provided in expression 10 (see U.S. Pat. No. 6,556,908 for detail)

$$\theta_{yr} = m(a_x, \dot{\omega}_y; \kappa, \lambda) \quad (10)$$

The relative pitch $\theta_{yr}$ can be further written as shown in equation 11, $$\theta_{yr} = \kappa T_{pitch}(z) a_x + \lambda T_{pitch}(z) \dot{\omega}_y \quad (11)$$

where $T_{pitch}(z)$ is a filter which reflects the linear pitch model of the vehicle, i.e., it includes the pitch stiffness and damping effect due to the vehicle suspension dynamics. $T_{pitch}(z)$ is different for vehicle deceleration and acceleration, i.e., $$T_{pitch}(z) = \begin{cases} T_{pitchacc}(z) & \text{if } a_x > 0 \\ T_{pitchdec}(z) & \text{if } a_x \leq 0 \end{cases} \quad (12)$$

and the same is true for the pitch gradient $\kappa$ and the pitch acceleration coefficient $\lambda$, see expression 13.

$$\kappa = \begin{cases} \kappa_{acc} & \text{if } a_x > 0 \\ \kappa_{dec} & \text{if } a_x \leq 0 \end{cases} \quad (13)$$

$$\lambda = \begin{cases} \lambda_{acc} & \text{if } a_x > 0 \\ \lambda_{dec} & \text{if } a_x \leq 0 \end{cases}$$

If the pitch angular rate $\omega_y$ is not available, the above relative pitch $\theta_{yr}$ can be approximated as in expression 14, $$\theta_{yr} \approx \kappa T_{pitch}(z) a_x \quad (14)$$

which is acceptably accurate at low frequency region (pitch acceleration term only provides high frequency contents).

By equating 2 and 9 on level ground, $\theta_x = \theta_{xr}$, the following equation 15 is obtained $$\alpha X - \beta Y = U \quad (15)$$

where $$X = T_{roll}(z)(1 - T_{ssc}(z)) a_y$$

$$Y = T_{roll}(z)(1 - T_{ssc}(z)) \dot{\omega}_x$$

$$U = T_{adi}(z)[\omega_x + \omega_z \theta_{yr}] \quad (16)$$

In step 106, the filtered lateral acceleration X is determined in the following iterative equation 17, $$X_k = d_{11} X_{k-1} + d_{12} X_{k-2} + d_{13} X_{k-3} + n_{11} a_{y_k} + n_{12} a_{y_{k-1}} + n_{13} a_{y_{k-2}} + n_{14} a_{y_{k-3}} \quad (17)$$

where $d_{1i}, n_{1i}$ for i=1, 2, 3, 4 are the involved first set of the filter coefficients.

In step 109, the filtered roll acceleration Y as is determined in the following iterative equation 18.

$$Y = d_{11} Y_{k-1} + d_{12} Y_{k-2} + d_{13} Y_{k-3} + n_{11} \dot{\omega}_{x_k} + n_{12} \dot{\omega}_{x_{k-1}} + n_{13} \dot{\omega}_{x_{k-2}} + n_{14} \dot{\omega}_{x_{k-3}} \quad (18)$$

In step 110, the filtered roll angle velocity, which is the sum of the roll rate and the product of the relative pitch and yaw rate, may be calculated in the following iterative equation 19, $$U = d_{21} U_{k-1} + d_{22} U_{k-2} + d_{23} U_{k-3} + n_{21} R_k + n_{22} R_{k-1} + n_{23} R_{k-2} + n_{24} R_{k-3} \quad (19)$$

where $R_k$ is the total roll angle velocity at the $k^{th}$ time instant on level ground, i.e., $$R_k = \omega_{x_k} + \omega_{z_k} \theta_{yr_k} \quad (20)$$

where $d_{2i}, n_{2i}$ for i=1, 2, 3, 4 are the involved $2^{nd}$ set of the filter coefficients. If the approximation 14 is used, the total roll velocity on level ground can be approximated as in the following $$R_k \approx \omega_{x_k} + \kappa \omega_{z_k} T_{pitch}(z) a_{x_k} \quad (21)$$

Using the calculated filtered value $X_k, Y_K$ and $U_k$ at each sampling instant k, equation 15 can be used to potentially compute the unknown parameters of the roll gradient $\alpha$, the roll acceleration coefficient $\beta$ if the roll rate coefficient $\eta$ is determined independent of the determination of $\alpha$ and $\beta$. A more complicated method is needed in order to obtain $\alpha$, $\beta$ and $\eta$ simultaneously. One method to compute the unknown values $\alpha$ and $\beta$ in equation 15 is the so-called least-square method.

Since equation 15 is true when the vehicle is driven on level ground and the vehicle does not have any wheel in the air (4 tires are contacting the road), a conditional least-square (CLS) method is used. Two CLS's may be used. The first CLS method conduct $\alpha$ and $\beta$ parameter updating after a fixed number of conditional samples, while the second method updates α and β and resets a covariance matrix at each conditional sample.

Figure 6A:
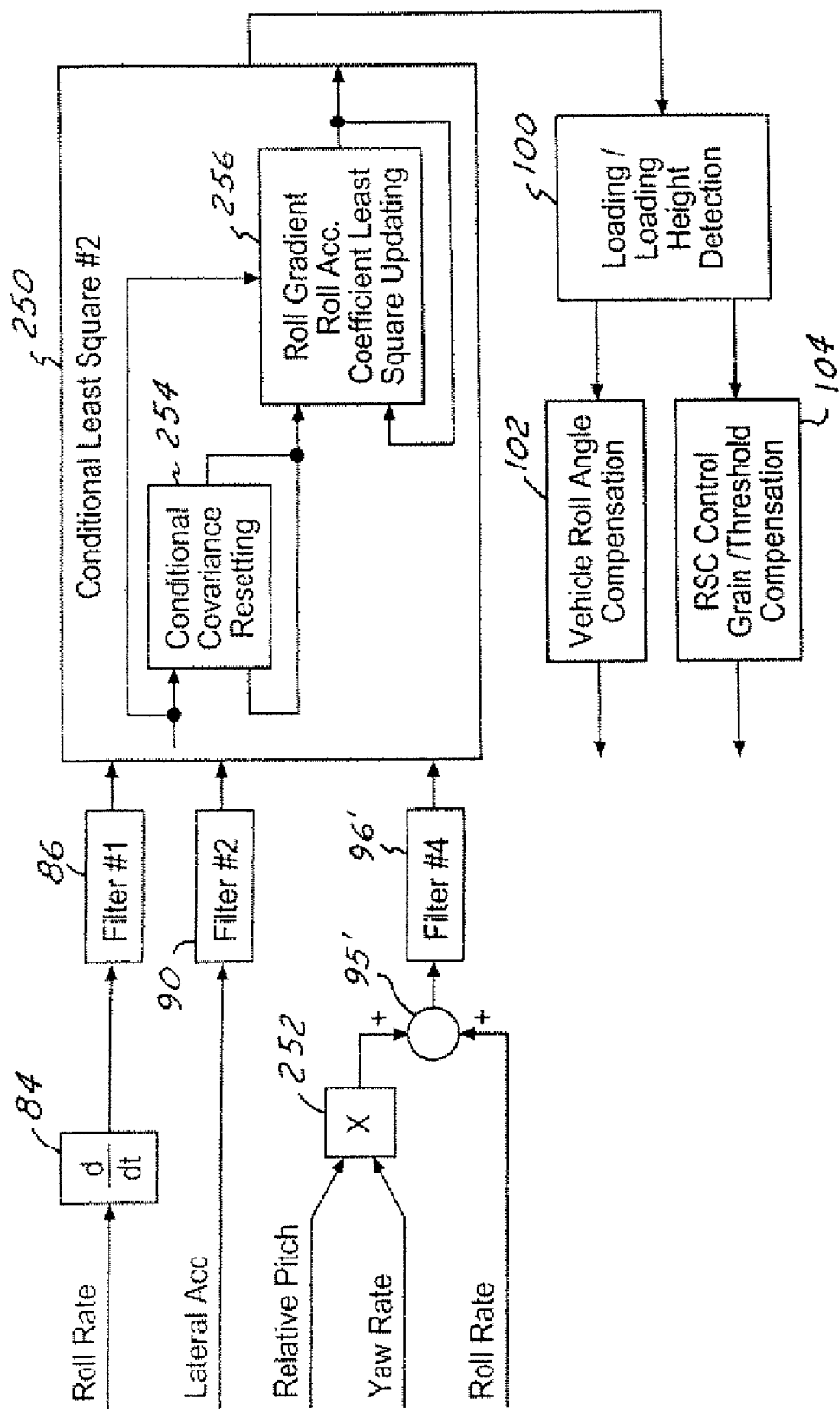
FIG. 6A is a block diagrammatic view of a controller according to a second embodiment of a least square method of the present invention.

Referring to FIG. 6A, the second conditional least square method is illustrated by box 250. Blocks 84, 86, 90 are the same as in FIG. 6. This embodiment, however, uses a relative pitch signal instead of the longitudinal acceleration signal. The relative pitch signal and yaw rate signal are multiplied in block 252. The output of block 252 is added to the roll rate in addition to block 95, and filtered in block 96'. The filtered signals from blocks 86, 90, 96' are provided to a conditional covariance block 254. The block 254 output is provided to roll gradient, roll acceleration coefficient least square updating block 256, which provides an output to block 100.

Since α and β are related to the inertia parameters of the vehicle body roll motion, only if the vehicle roll mode is fully excited α and β can be identified correctly through least-square methods. Hence, under the steady-state driving condition, the least-square identification is not conducted. Therefore, a further condition reflecting vehicle roll dynamic condition is needed. Considering the driver's steering input could induce roll dynamics, one of such conditions can be characterized using the steering wheel angle velocity, i.e., only if the absolute value of the steering wheel angle velocity $\dot{\delta}_w$ is greater than or equal to the steering wheel angle threshold $\delta_{wvmin}$ the CLS method will be conducted, $\delta_w$ is the measured steering wheel angle, $\delta_{wvmin}$ is a threshold (for example, 20 degree per second).

In step 114, the conditional sum of the products or cross products of the above filtered variables are determined over a significant large number N of the conditional samples. This is performed using the following iterative algorithm 22 if the first CLS method is used.

$$\text{if } (|\dot{\delta}_w| \geq \delta_{wvmin} \text{ \& level ground} \qquad (22)$$
$$\text{\& no wheel lifting}$$
$$\text{\& } s \leq N)$$
$$\{$$
$$a_{11_{s+1}} = a_{11_s} + X_k^2$$
$$a_{21_{s-1}} = a_{21_s} - X_k Y_k$$
$$a_{22_{s+1}} = a_{22_s} + Y_k^2$$
$$b_{1_{s+1}} = b_{1_s} + X_k U_k$$
$$b_{2_{s+1}} = b_{2_s} - Y_k U_k$$
$$s = s + 1$$
$$\}$$

Notice that the time instant denoted by k is different from the CLS updating instant denoted by s. If the conditions are satisfied all the time, then s=k. N in equation 22 is the total number of conditional samples used for CLS, which could be from 1000 to 80,000.

Step 114 is performed for the conditional sample, when the road is a level ground. The level ground can be identified if there is an indication that the vehicle is not on a significantly banked road. Therefore, checking road bank can be used for this purpose, for example, using the method disclosed in U.S. Pat. No. 6,718,248. The level ground can also be checked through a flatness index (as the one calculated in U.S. Pat. No. 6,718,248), or a road profile detection (see U.S. Pat. No. 6,718,243), or a rough comparison between the global roll angle and the nominal chassis roll angle.

In step 116, the nominal values for $\alpha_0$ and $\beta_0$ of the roll gradient and roll acceleration coefficient are calculated. They can also be obtained by using test data from the vehicle with nominal loading condition and nominal configuration.

In step 118, the roll gradient α and the roll acceleration coefficient β are computed as in the following $$\text{if } s = N \qquad (23)$$
$$\{$$
$$D = \min\left(\max\left(a_{11_N} - \frac{a_{21_N}^2}{\max(a_{22_N}, a_{\min})}, a_{\min}\right), a_{\min}\right);$$
$$\alpha = \min\left(\max\left(\left(b_{1_N} - \frac{a_{21_N} b_{2_N}}{\max(a_{22_N}, a_{\min})}\right) D^{-1}, \underline{\alpha}\right), \overline{\alpha}\right);$$
$$\beta =$$
$$\min\left(\max\left(\left(\frac{a_{11_N} b_{2_N}}{\max(a_{22_N}, a_{\min})} - \frac{a_{21_N} b_{1_N}}{\max(a_{22_N}, a_{\min})}\right) D^{-1}, \underline{\beta}\right), \overline{\beta}\right);$$
$$s = 0;$$
$$a_{11_s} = 0; a_{21_s} = 0; a_{22_s} = 0;$$
$$b_{1_s} = 0; b_2 = 0;$$
$$\}$$

where $a_{min}$ is a small number (for example, 0.0001), which is used to remove division by zero in the implemented computation; $\underline{\alpha}$ and $\overline{\alpha}$ are the respective lower and upper bounds of the roll gradient, which can be calculated as by equations generally designated 24

$$\underline{\alpha} = \alpha_0 - \Delta\alpha$$
$$\overline{\alpha} = \alpha_0 + \Delta\alpha \qquad (24)$$

Where $\alpha_0$ is the nominal value of the roll gradient (obtained through vehicle testing for the vehicle with nominal loading), Δα is the allowed variation of the roll gradient. $\underline{\beta}$ and $\overline{\beta}$ are the respective lower and upper bounds of the roll acceleration coefficient β, which can be obtained as provided in equations generally designated 25

$$\underline{\beta} = \beta_0 - \Delta\beta$$
$$\overline{\beta} = \beta_0 + \Delta\beta \qquad (25)$$

where $\beta_0$ is the nominal value of the roll acceleration coefficient (for vehicle with nominal loading), Δβ is the allowed variation of the roll acceleration coefficient. If the second CLS method is used, the roll gradient α and the roll acceleration coefficient β can be calculated in block 256 through the following iterative algorithm. First, a 2 by 2 matrix variable $V_{s+1}$ at the $(s+1)^{th}$ conditional time instant is calculated from its past value $V_s$ and the calculated filtered values of $X_k$ and $Y_k$ as in the following algorithm 26

$$\text{if } (|\dot{\delta}_w| \geq \delta_{wvmin} \text{ \& level ground} \qquad (26)$$
$$\text{\& no wheel lifting}$$
$$\text{\& } s \leq N)$$

-continued $$\text{if } (s = 0)$$
$$\left\{ V_0 = \begin{bmatrix} v_0 & 0 \\ 0 & v_0 \end{bmatrix}; \right\}$$
$$V_{s+1} = V_s - g \frac{V_s \begin{bmatrix} X_k^2 & -X_k Y_k \\ -X_k Y_k & Y_k^2 \end{bmatrix} V_s}{1 + \gamma [X_k \ -Y_k] V_s [X_k \ -Y_k]^T};$$
} where g, γ and $v_0$ are three positive numbers, and the time instant k denotes the regular time instant and the time instant s is the conditional time instant. Algorithm (26) is may be referred to as the covariance resetting in the normalized least square algorithm.

The roll gradient and the roll acceleration coefficient are calculated using the 2 by 2 matrix $V_s$, and the calculated filtered values $X_k$, $Y_k$ and $U_k$, as in the following algorithm 27

$$\text{if } \left( |\dot{\delta}_w| \geq \delta_{wvmin} \ \& \text{ level ground} \right. \tag{27}$$
$$\& \text{ no wheel lifting}$$
$$\& \ s \leq N \right)$$
{
$$\begin{bmatrix} \alpha_{s+1} \\ \beta_{s+1} \end{bmatrix} = \begin{bmatrix} \alpha_s \\ \beta_s \end{bmatrix} - g \frac{S_x [X_k \ -Y_k]^T U_k}{1 + \gamma [X_k \ -Y_k] S_s [X_k \ -Y_k]^T};$$
$$s = s + 1;$$
}

The calculated values are also limited to within their feasible sets as in the following equations generally designated 28.

$$\alpha_{s+1} = \text{sat}(\alpha_{s+1}, \alpha_0 - \Delta\alpha, \alpha_0 + \Delta\alpha)$$
$$\beta_{s+1} = \text{sat}(\alpha_{s+1}, \beta_0 - \Delta\beta, \beta_0 + \Delta\beta)$$

Notice that during the time instant where the conditions for 26 and 27 do not hold, the computations are frozen to the last values. That is if the following conditions, provided in expression 29, are not true at a time instant k, $$\left( |\dot{\delta}_w| \geq \delta_{wvmin} \ \& \text{ level ground} \right. \tag{29}$$
$$\& \text{ no wheel lifting}$$
$$\& \ s \leq N \right)$$

then the computation using equations 2, 27, and 28 is not conducted, and the involved variables will keep the value for the last conditional sample s, as shown by relationships designated as 30

$$V_k = V_s;$$
$$\alpha_k = \alpha_s;$$
$$\beta_k = \beta_s. \tag{30}$$

From the calculated roll gradient and the roll acceleration coefficient, the vehicle loading and its distance to the center of gravity of the vehicle body in the vertical direction can be determined in the following in step 122.

From FIG. 4, $M_s$ is the vehicle body mass and the height of the center of gravity $C_0$ of the car body is denoted as h which is measured in the vertical direction with respect to the vehicle floor. A loading of mass ΔM is added to the vehicle. The distance between the center of gravity of this mass relative to the vehicle floor is denoted as H. The center of gravity C of the vehicle body is likely to change due to the added mass ΔM. The distance between $C_0$ and C is denoted as ΔH. Then ΔH must satisfy the following relationship;

$$\Delta H = \frac{\Delta M}{M_s + \Delta M}(H - h) \tag{31}$$

that is, the unknown ΔH can be readily obtained from the added mass ΔM, the height of the added mass H, the center of gravity height h of the vehicle body and the vehicle mass M, prior to the addition of the mass ΔM.

The total roll inertial momentum of the vehicle body with respect to the final center of gravity C can be expressed as shown in equation 32, $$I_{xc} = I_{xc}^M + I_{xc}^{\Delta M} \tag{32}$$

where equations generally designed as 33 hold true $$I_{xc}^M = I_{xc0} + M_s \Delta H^2$$
$$I_{xc}^{\Delta M} = \Delta M (H - h - \Delta H)^2 \tag{33}$$

By inserting equation 31 into equations 33, equation 32 can be expressed as equation 34

$$I_{xc} = I_{xc0} + \frac{M_s \Delta M (H - h)^2}{M_s + \Delta M} \tag{34}$$

The nominal roll gradient and the roll acceleration coefficient is $\alpha_0$ and $\beta_0$. Then equations generally designated 35 hold true, $$\alpha_0 = \frac{M_s h}{K_{roll}} \tag{35}$$
$$\beta_0 = \frac{I_x}{K_{roll}}$$

where $K_{roll}$ denotes the roll stiffness due to suspension and anti-roll bar. Using those nominal values and the calculated values α and β, the loading mass and the loading distance satisfy the equations generally designated 36

$$\Delta M H = K_{roll}(\alpha - \alpha_0) = A \tag{36}$$
$$\frac{\Delta M M_s (H - h)^2}{M_s + \Delta M} = K_{roll}(\beta - \beta_0) = B$$

From the relationships in equations 36, the following estimations, designated 37, may be determined.

$$\begin{cases} H = h + \dfrac{B}{2A} + \sqrt{\dfrac{1}{4}\left(\dfrac{B}{A}\right)^2 + h\left(\dfrac{B}{A}\right) + \left(\dfrac{B}{M_s}\right)^2} \\ \Delta M = \dfrac{\alpha}{h + \dfrac{B}{2\alpha} + \sqrt{\dfrac{1}{4}\left(\dfrac{B}{A}\right)^2 + h\left(\dfrac{B}{A}\right) + \left(\dfrac{B}{M_s}\right)^2}} \end{cases} \quad (37)$$

In step 124, the height H of the added mass (ΔM) from the vehicle floor based on the first equation of 37 is determined.

In step 126, the added mass ΔM is determined based on the second equation of 37 by using the calculated height H of the added mass.

In step 128, a safety system such as a roll stability control system is controlled in response to the added mass and the height of the added mass. The safety system may also be controlled directly from the roll gradient and roll rate parameter, both of which may be adaptive. The safety system may also include the roll acceleration coefficient, which may also be adaptive as a factor in addition to the adaptive roll gradient and adaptive roll rate parameter. A vehicle roll angle compensation term may be determined such as that shown above. The vehicle roll angle compensation term may sensitize the roll angle computation for earlier deployments. The amount of roll compensation will depend on the particular vehicle and the characteristics of such things as the suspension and configuration of the vehicle. A roll stability control gain/threshold compensation term may also be generated. The threshold may be changed to allow earlier deployment if an added mass at a predetermined height is determined in steps 124 and 126. The amount of compensation will likely be determined experimentally based on the vehicle configuration.

Thus, as can be seen, the roll signal for control may be adjusted according to the vehicle loading and its height. On the other hand, if the vehicle has a significant amount of loading, i.e., the calculated loading exceeds a threshold, or the added mass ΔM is greater than or equal to a load maximum value $L_{max}$, and at the same time the height H of the mass exceeds or equal to a height threshold $H_{max}$ then in addition to the adjusted computation of roll signal for control (through the adjustment of the chassis roll angle using the new roll gradient and roll acceleration coefficient), all the gains for the feedback control used for commanding the actuators are set to a set of values $G_{RLMAX}$ tuned for larger roof loadings, or adaptively adjusted in high values based on the amount of added mass ΔM. In this way, when the vehicle has double wheel lift, the proper amount of actuation will be requested so the vehicle achieves robust roll stability control function during rollover event involving vehicles with large roof loadings.

If the vehicle has a significant loading, i.e., the added mass ΔM is greater than or equal to the load maximum $L_{max}$, but the loading is a floor loading, that is, the height H of the loading is smaller than or equal to a lower threshold $H_{min}$ the gains for the feedback control used for commanding the actuators are set to a set of values $G_{FLMAX}$ tuned for larger floor loadings.

If the vehicle has a significant loading, i.e., the added mass ΔM is greater than or equal to a load maximum value $L_{max}$, but the loading height H is between the roof and floor, i.e., the loading height H is between a lower threshold $H_{min}$ (possibly zero) and the higher threshold $H_{max}$ the gains for the feedback control used for commanding the actuators are set to the following values adjusted based on the detected loading height as in the equation 38

$$G_H = G_{FLMAX} + \dfrac{H - H_{min}}{H_{max} - H_{min}}(G_{RLMAX} - G_{FLMAX}) \quad (38)$$

If the vehicle has a roof loading which is below the maximum allowed roof loading $L_{max}$ but above the lower bound of a valid roof loading $L_{min}$, i.e., $$L_{min} \leq \Delta M \leq L_{max} \quad (39)$$

Assume all the nominal gains for feedback (for the vehicle with nominal loading) are denoted as $G_{nom}$, then the control gains will be adjusted based on the detected roof loading as in the following $$G_{\Delta M} = G_{nom} + \dfrac{\Delta M - L_{min}}{L_{max} - L_{min}}(G_{RLMAX} - G_{nom}) \quad (40)$$

The roll gradient itself can also be directly used to adjust control gains. If the vehicle has a significant increase of roll gradient, i.e., $\alpha \geq \alpha_{min}$, then all the gains for the feedback control used for commanding the actuators are set to the following values adjusted based on the detected roll gradient as in the following $$G_\alpha = G_{\alpha MIN} + \dfrac{\alpha - \alpha_{min}}{\alpha_{max} - \alpha_{min}}(G_{\alpha MAX} - G_{\alpha MAX}) \quad (41)$$

where $\alpha_{min}$ is the roll gradient corresponding to a vehicle without roof loading and $\alpha_{max}$ is the roll gradient corresponding to the vehicle with maximum roof loading allowed.

Notice that the control gain adjustments other than the above listed linear interpolation methods are possible. Also, notice that the dead-bands and thresholds used in roll stability feedback control can also be similarly adjusted based on the loading height H and/or the loading ΔM, or the roll gradient, or the roll moment of inertia calculated as in (30).

Combining those control gain, dead-band and threshold adjustments with the quantitative roll angle (for example, the chassis roll) adjustment, a robust roll stability control function can be achieved.

Notice that based on the aforementioned computation of the added mass and its vertical from the vehicle floor, the roll moment of inertia of the vehicle body can be readily calculated as in 34. Alternatively, the roll moment of inertia $I_{xx}$ can be determined directly by using the equation, $$M_s a_y h_{cg} - K_{roll}\theta_{xr} - D_{roll}\dot{\theta}_{xr} = I_{xx}\dot{\omega}_x \quad (42)$$

where $M_s$ is vehicle mass, $a_y$ is the measured lateral acceleration, $h_{cg}$ is the center of mass height above the roll center, $K_{roll}$ is the roll stiffness of the suspension, $\theta_{xr}$ is the relative roll of the body with respect to the wheels (or ground), $D_{roll}$ is the roll damping of the suspension, $\dot{\theta}_{xr}$ is the relative roll velocity and $\dot{\omega}_x$ the roll acceleration (obtained by differentiating the roll rate obtained from the roll rate sensor), and $I_{xx}$ is the roll inertia, in kg-m².

When $a_y$ and $\theta_{xr}$ are zero but $\dot{\theta}_{xr}$ and $\dot{\omega}_x$ are non-zero, then $$I_{xx} = D_{roll}\dot{\theta}_{xr}/\dot{\omega} \quad (43)$$

Or, when $\theta_{xr}$ and $\dot{\theta}_{xr}$ are zero and the mass, $m_s$ is determined by another means, $$I_{xx} = M_s a_y h_{cg}/\dot{\omega}_x \quad (44)$$

Alternatively, the roll response of the vehicle, obtained from the roll rate sensor, can be analyzed in the frequency domain to determine the roll gradient and the roll acceleration coefficient, where $\omega_d$ is the damped natural frequency of the roll motion of the vehicle (Hz), $\omega_n$ is the undamped natural frequency of the roll motion of the vehicle (Hz), and $\zeta$ is the damping ratio of the roll motion of the vehicle (unitless).

Taking the Laplace transform of equation 45 and rearranging yields equation 46 by considering $\omega_x \approx \dot{\theta}_{xr}$ when the vehicle does not have large pitch motion or the vehicle does not have large yaw rate:

$$\ddot{\theta}_{xr} + \frac{D_{roll}}{K_{roll}}\dot{\theta}_{xr} = \frac{M_s h_{cg}}{K_{roll}}a_y - \frac{I_{xx}}{K_{roll}}\dot{\omega}_x \quad (45)$$

$$\frac{\Theta_{xr}(s)}{A_y(s)} = \frac{1}{\frac{I_{xx}}{M_s h_{cg}}s^2 + \frac{D_{roll}}{m_s h_{cgs}}s + \frac{K_{roll}}{n_s h_{cgs}}} \quad (46)$$

$$= \left(\frac{M_s h_{cg}}{K_{roll}}\right) \frac{1}{\frac{I_{xx}}{K_{roll}}s^2 + \frac{D_{roll}}{K_{roll}}s + 1}$$

where $\Theta_{xr}(s)$ and $A_y(s)$ are the Laplace transform of the $\theta_{xr}$ and $a_y$, respectively.

Using a digital fast Fourier transform to construct a frequency response function and determine the magnitude of $\Theta_{xr}(s)$ divided by $A_y(s)$ vs. frequency, the roll gradient is equal to the DC gain (Equation 11 evaluated at s=0).

The peak of the magnitude of the frequency response function will occur at the damped natural frequency, $$\omega_d = \omega_n \sqrt{1-\zeta^2} \quad (47)$$

where $\omega_n$ is the undamped natural frequency and $\zeta$ is the damping ratio. (Alternatively, the damped natural frequency can be determined from "impulse-like" inputs into the suspension (hitting a bump in the road or a pot-hole), and determining the frequency of the roll oscillations). From equation 45, $\omega_n$ is related to the roll acceleration coefficient $\beta$.

$$\omega_n = \sqrt{\frac{K_{roll}}{I_{xx}}} \Rightarrow \frac{I_{xx}}{K_{Roll}} = \frac{1}{\omega_n^2} = -\beta \quad (48)$$

$$\zeta = \frac{\omega_n D_{roll}}{2K_{roll}} \quad (49)$$

Substituting Equation 49 into Equation 47 gives $$\omega_d = \omega_n \sqrt{1 - \frac{\omega_n D_{roll}^2}{2K_{roll}}} \quad (50)$$

Equation 50 can be solved for $\omega_n$, which can in turn be used to evaluate Equation 48 and solve for the roll acceleration coefficient $\beta$.

Another way to determine roll inertia is to use an indirect empirical approach. First, a mass is determined, then the inertia may be correlated to mass. That is, a first estimate mass is determined via a method such as that described in Invention Disclosure (203-0482) filed as U.S. patent application Ser. No. 10/849,590, the disclosure of which is incorporated by reference herein, or another method. Then the inertia may be obtained per various methods explained below:

Assume inertia changes as mass changes from its base values, $m_{x\_base}$ to the current value, $m_{x\_current}$ as:

$$I_{xx\_total} = I_{xx\_base} + h_2(m_{s\_current} - m_{s\_base}) \quad (51)$$

where $h_2$ is assumed to be a constant. Based on testing for a vehicle loaded several ways, an average may then be used. First, the roll inertia, $I_{xx}$, is correlated to vehicle mass; e.g., via testing using a vehicle inertial measurement facility to get roll inertia, the mass for various loading conditions and roof loads may be correlated. This is based on the premise that you can only load an SUV so many ways (e.g., mass above curb loading must be placed in vehicle seats and/or on the roof rack). Again, the vehicle mass may be determined via a method described in U.S. patent application Ser. No. 10/849, 590 or another method, then use the roll inertia, $I_{xx}$, corresponding to that mass obtained from testing.

The currently estimated mass or roll inertia estimate can be used several ways in the RSC algorithm, including:

Improved state estimation: Since mass and inertia values are used in the roll, pitch, and yaw angle state estimates, values accurately reflecting the actual vehicle will improve the accuracy, improve RSC control, and reduce the occurrence of false interventions.

Modified thresholds for activation: For example, a fully loaded vehicle can be less stable in roll. Hence, tighter thresholds on roll angle and roll rate, for example, can be used. This will increase the level of RSC control for the same level of roll angle and velocity for the loaded vehicle.

Figure 8:
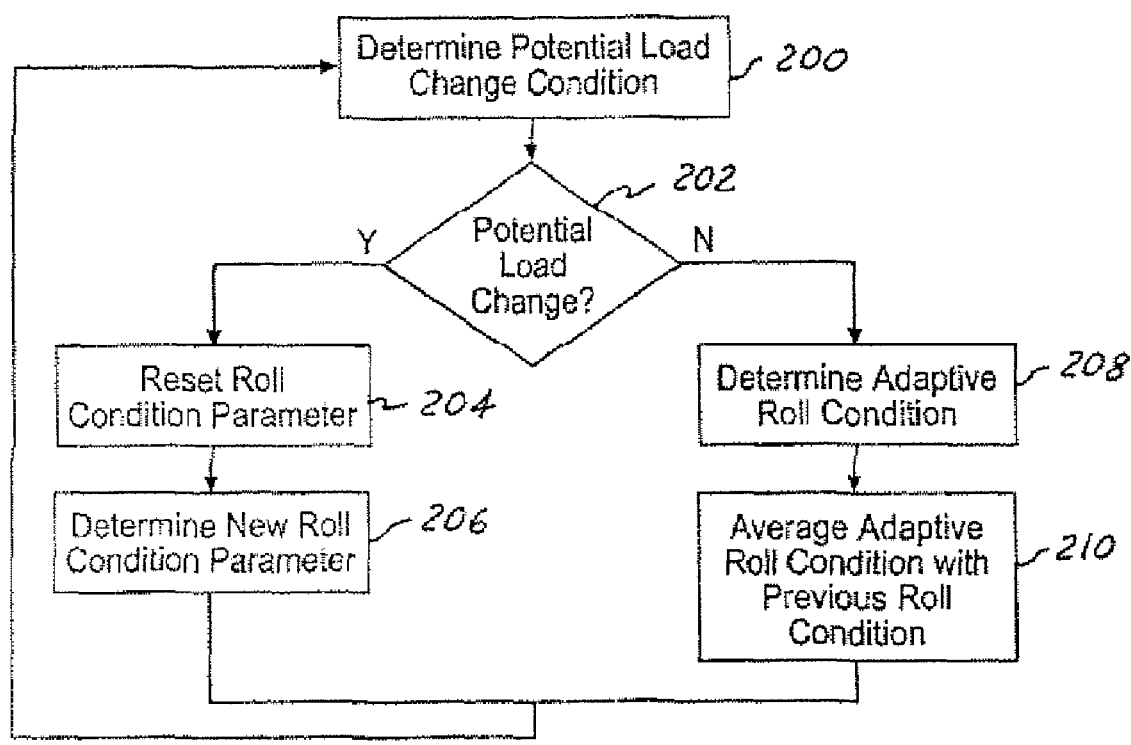
FIG. 8 is a flow chart to qualitatively determine changes to vehicle loading.

Referring now to FIG. 8, determination of a roll condition parameter such as roll gradient, roll acceleration coefficient, roll damping parameter, roll inertia mass or center of gravity height may be determined on an iterative basis and in a conditional least square sense so that the data is averaged and summed over a long period of time. The longer the data is averaged and summed the more robust the estimates may be in response to the uncertainties, the road variations, the noise and the unnecessary screened conditions. However, due to the conflicting requirement for averaging (longer period of averaging leads to more robust estimates but needs longer time to find the true parameter) and for fast detection, there must be a trade-off between the length of data used in the conditional least square algorithm in order to obtain timely indication of loading changes. That is, in order to achieve a fast detection of the changes in the estimates, the length of the data used in the conditional least square algorithm needs to be short, while short data length provides less reliable and robust estimates. On the other hand, the accumulative sum of the products of the involved variables in the conditional least square algorithm could cause computation overflow if the sum is kept going without re-initialization, A fixed data length N (for example, a number between 1000 and 100,000) could be used for resetting or re-initialization. That is, every N steps (where the screening condition are true), the conditional least square computation may be restarted. Notice that in some driving conditions, a reliable computation can be achieved without using all the N data points. On the other hand, if there is a strong indication that the vehicle has not changed loading condition during a trip, a re-initialization would forget the information gained during last computation and delay a potentially timely detection. For this reason, a qualitative detection of a roll condition parameter change is further used to eliminate resetting when it is clearly not necessary. That is, the conditional least square algorithm provides a quantitative determination of the vehicle roll parameters and loading related parameters upon the qualitative determination of loading change. More specifically, the re-initialization used in the conditional least square algorithm is conducted upon the qualitative determination of the roll parameter and loading changes, if there is any, otherwise, the normal N data points will be used.

For example, vehicle loading can only be changed when the vehicle is stopped. Hence, each time the vehicle comes to a stop a potential for a vehicle loading change might be presented. For that reason, the qualitative determination might be initiated when the vehicle is stopped. Thus, FIG. 8 sets forth a method for qualitatively determining a potential load change condition of the vehicle. Essentially, when a load change is qualitatively determined or a potential for a load change is qualitatively determined, the conditional least square algorithm will reset the variables involved in the cumulative sums to zero so that a new running average used in the conditional least square algorithm may be determined. As is set forth below, the load change is determined indirectly so an additional load sensor or sensors do not need to be added to the vehicle.

In step 200, a potential load change condition is qualitatively determined by observing various operation or dynamics states and sensor signals in the vehicle. Since the vehicle loading changes are usually conducted by the occupants or the driver from the vehicle, the vehicle door ajar would be one of the conditions for initiating loading change. Therefore, a qualitative determination of the loading change includes checking if door ajar signals from the door/tailgate sensor 41 are present.

The longitudinal acceleration of the vehicle relative to the estimated driveshaft torque may also provide an indication of a load change. Hence, another qualitative determination of the loading change involves checking if the longitudinal acceleration measured from the sensor deviates much from the one computed based on the driveshaft torque divided by the nominal vehicle loading and mass.

The low frequency aspect of the suspension height or suspension position sensor 40 may also be used to provide an indication of a change in load. Hence, another qualitative determination of the vehicle loading change involves checking if low pass filtered suspension height sensor signals are below a certain threshold, which can be obtained through vehicle tests or experiments.

The transmission controller 42 may also provide transmission data, which changes based upon loading. A direct signal may be generated from the transmission controller 42. Therefore another qualitative determination of loading change involves checking vehicle transmission information together with vehicle longitudinal acceleration, driveshaft torque, etc.

Another qualitative determination 59 of the potential load change involves checking a change in the vehicle shift data together with other vehicle dynamics states.

The vehicle loading changes might be qualitatively seen from the driver throttle request. If the driver requests throttle and the vehicle does not provide enough acceleration, the driver would increase throttle request level consistently. By checking how many times the driver is initiating excessive throttle and the information from accelerator/throttle signal generator 43A, the qualitative determination of load change would indicate that the vehicle might have significant loading changes. Such a sensor may be coupled directly to the accelerator pedal or may be coupled to the throttle. Typical throttle sensors include a resistive sensor through which the amount of throttle opening and closing may be observed.

The vehicle loading changes might be qualitatively determined from the driver braking request. If the driver requests certain driver braking pressure and the vehicle does not provide enough deceleration, the driver would increase braking pressure request level consistently. By checking how many times the driver is initiating spike or excessive braking and the brake pedal/brake signal generator 43B, the qualitative determination of load change would indicate that the vehicle might have significant loading changes. A brake pedal/brake signal generator may be coupled directly to the brake pedal to determine the driver braking trends. By applying more or less braking the loading increase or reduction may be determined.

In step 202, when a potential for a load change is determined from the qualitative determination logic set forth in step 200, the least square sum variables used in the conditional least square algorithm are reset to zero in step 204. That is, the roll condition may be reset to a default value so that new least square running averages and sums may be started. In step 206, a new or revised roll condition parameter may be determined based on the newly calculated variables involving least square running averages and sums.

Referring back to step 202, when the qualitative determination logic determines that a potential load change has not happened, then another adaptive roll condition may be determined in step 208. That is, based on the current dynamic sensors, another adaptive roll condition may be determined. In step 210 this new adaptive roll condition may be averaged with the previously determined adaptive roll condition. After steps 206 and 210, the system returns to step 200 in which a potential load change condition is determined.

In the above discussion, vehicle roll dynamic variations are assumed due to the vehicle loading changes, such as added roof loading, and the suspensions themselves are assumed to be operated normally. That is, a suspension component irregularity or problem does not exist.

However, vehicle roll dynamic variations can be directly affected by suspension component variations, such as variations in suspension springs, suspension dampers, and anti-roll bars. A suspension component variation or irregularity may be any abnormal operation of the stated components due to aging, wear, damage, etc.

Generally, when both the vehicle loading and the suspension variations occur together, simultaneously detecting the loading and the suspension variation through vehicle roll dynamics can be complex. For example, the suspension spring variations may have the similar effect as vehicle roof loading changes. In order to detect both suspension spring variation and the roof loading, more complicated algorithms are needed.

As described above, the suspension spring rate and anti-roll-bar spring rate usually have little associated change over time. Hence the suspension spring rates are assumed to be constant. A fine but simultaneous detection of a vehicle damper irregularity and vehicle roof loading is feasible. The following description provides for such detection. That is, it is assumed that the suspension spring rates are at their nominal values and the suspension damping rates and the vehicle roof loading are able to vary.

Simultaneous detection of suspension damper irregularity and vehicle roof loading is meaningful since a suspension damper irregularity happens much more often than a suspension spring or an anti-roll-bar irregularity.

Figure 9:
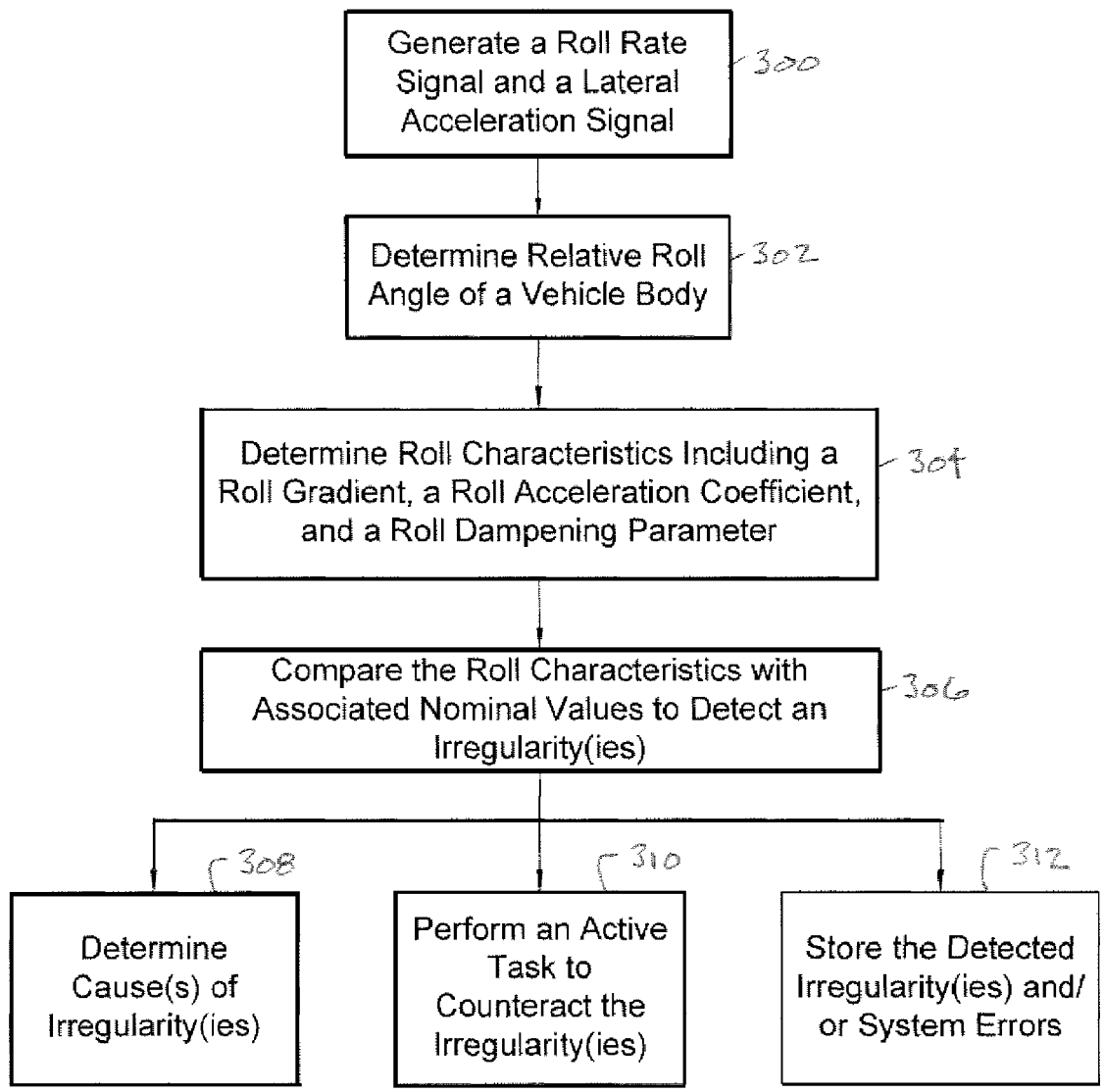
FIG. 9 is a logic flow diagram illustrating a method of determining vehicle suspension irregularities according to multiple embodiments of the present invention.

Referring again to FIG. 2 and to FIG. 9, which a logic flow diagram is shown illustrating a method of determining vehicle suspension irregularities. The term "suspension irregularities" refers to suspension damper functioning irregularities or errors in operation as compared to its nominal function. The term "suspension irregularities" is different from the parameter values measured during an aggressive roll condition or other non-normal operating condition, which might cause the suspension to operate in its nonlinear operating range. Suspension irregularities may be determined during a roll condition, but are not a direct result of the roll condition, rather are a result of the suspension damper component malfunction or error. Suspension irregularities may be a causing factor of a roll condition variation or hinder the ability for the roll stability control system to overcome or correct for a roll situation.

In step 300, a roll angular rate sensor and a lateral acceleration sensor, such as the sensors 34 and 32, generate a roll rate signal $\omega_x$ and a lateral acceleration signal $a_y$.

In step 302, the relative roll angle $\theta_{xr}$ of the vehicle body with respect to the axle of the wheels is determined using the past value of the roll gradient, the roll acceleration coefficient, and the roll damping parameter. The relative roll angle i, is thus determined and the loading and roll damping condition are used in RSC feedback command unit 56 such that the RSC feedback control can be adjusted in response to suspension damping change or loading change.

In step 304, roll characteristics, such as the roll gradient (lateral acceleration coefficient) $\alpha$, the roll acceleration coefficient $\beta$, and the roll damping parameter $\eta$ defined in equation 6, are simultaneously determined. The algorithm is based on the following equation 52, which is directly obtained from equation 3, but in Laplace transform format, $$\theta_{xr}(s) = \alpha a_y(s) - \eta \dot{\theta}_{xr}(s) - \beta \dot{\omega}_x(s) \tag{52}$$

The global roll angle $\theta_x(s)$ can be determined as in equation 9, which is rewritten as equation 53.

$$\begin{aligned}\theta_x(s) &= RollAngleDyn + RollAngleStat \\ &= T_{ADI}(s)\omega_x(s) + (1 - sT_{ADI}(s))\theta_{xss}(s) \\ &= T_{ADI}(s)\omega_x(s) + T_{SSC}(s)\theta_{xss}(s)\end{aligned} \tag{53}$$

where RollAngleDyn and RollAngleStat are the filtered high frequency roll angle portion and the filtered low frequency roll angle portions of the roll angle determined using the antidrift integration filter $T_{ADI}(s)$, the role rate information axis), the steady state compensation filter $T_{SSC}(s)$, and the steady state roll capture angle $\theta_{xss}(s)$. The steady state roll capture angle $\theta_{xss}(s)$ is equal to the sum of the relative roll angle $\theta_{xr}$ and the wheel departure angle $\theta_{wda}$.

For conditions when the wheel departure angle $\theta_{wda}$ and the bank angle $\theta_{bank}$ are close to zero, equation 53 becomes equation 54.

$$\theta_x(s) = T_{ADI}(s)\omega_x(s) + T_{SSC}(s)\theta_{XT}(s) = \theta_{XT}(s) \tag{54}$$

One technique that may be used to determine the roll gradient $\alpha$, the roll acceleration coefficient $\beta$, and the roll dampening parameter $\eta$ simultaneously is to use the conditional least-squares algorithm, as described previously. Based on (53) and (54), we obtain the following relationship 55.

$$\begin{aligned}T_{ADI}(s)\omega_x(s) &= (1 - T_{SSC}(s))\theta_{xr}(s) \\ &= (1 - T_{SSC}(s))(\alpha a_y(s) - \eta\dot{\theta}_{xr}(s) - \beta\dot{\omega}_x(s)) \\ &= RollAngleDyn\end{aligned} \tag{55}$$

The following variables are defined as:

LatAccStat=$T_{SSC}(s)A_y(s)$    RollRateStat=$T_{SSC}(s)\dot{\theta}_{xr}(s)$
RollAccStat=$T_{SSC}(s)\dot{\omega}_x(s)$ LatAccDyn=$(1-T_{SSC}(s))A_y(s)$    RollRateDyn=$(1-T_{SSC}(s))\dot{\theta}_{xr}(s)$ RollAccDyn=$(1-T_{SSC}(s))\dot{\omega}_x(s)$ Since the relative roll velocity $\dot{\theta}_{xr}(s)$ is also related to the unknown parameters, such as $\alpha$, $\beta$, and $\eta$, equation 55 is further manipulated. For the driving conditions such that equation 55 is satisfied, the relative roll velocity $\dot{\theta}_{xr}(s)$ can be replaced by the global roll angle velocity $\dot{\theta}_x(s)$. Hence on those conditions, the variables RollRateStat and RollRateDyn can be determined as in the following equations 56.

RollRateStat=$T_{SSC}(s)\dot{\theta}_x(s)$

RollRateDyn=$(1-T_{SSC}(s))\dot{\theta}_x(s)$ (56)

As such, the unknown parameters, such as $\alpha$, $\beta$, and $\eta$, may be related to the above-stated signals and variables through the following equation 57.

$T_{ADI}(s)\omega_x$=RollAngleDyn=$\alpha$*LatAccDyn−
$\eta$*RollRateDyn−$\beta$*RollAccDyn (57)

The unknown parameters $\alpha$, $\beta$, and $\eta$ may be determined using a real time least-squares method used in the previous 2-parameter detection algorithm. When the similar screening conditions hold and the conditional sample s is less than or equal to the total number of data points N that are desired for a robust estimation of the unknown parameters $\alpha$, $\beta$, and $\eta$, then the relationships, designated as 62, hold and the following iterative sums are conducted:

$a_{11_{s+1}} = a_{11_s} + \text{LatAccDyn}_s^2;$ $a_{21_{s+1}} = a_{21_s} - \text{RollRateDyn}_s \text{LatAccDyn}_s;$ $a_{31_{s+1}} = a_{31_s} - \text{RollAccDyn}_s \text{LatAccDyn}_s;$ $a_{22_{s+1}} = a_{22_s} + \text{RollRateDyn}_s^2;$ $a_{32_{s+1}} = a_{31_s} + \text{RollAccDyn}_s \text{RollRateDyn}_s;$ $a_{33_{s+1}} = a_{35_s} + \text{RollAccDyn}_s^2;$ $b_{1_{s+1}} = b_{1_s} + \text{LatAccDyn}_s \text{RollAngleDyn}_s;$ $b_{2_{s+1}} = b_{2_s} - \text{RollRateDyn}_s \text{RollAngleDyn}_s;$ $b_{3_{s+1}} = b_{3_s} - \text{RollAccDyn}_s \text{RollAngleDyn}_s;$ (58)

where the subscription s denotes the variables evaluated at the s-th time instant. The variables $a_{ij}$ and $b_i$ are matrix variables. The relationships 58 are determined for each sample s with s evolves as s=s+1 until s reaches the predetermined number N.

At the end of the above iterative summing, an intermediate variable $\Delta$, represented by equation 59, is computed, that is further used to determine the unknown parameters $\alpha$, $\beta$, and $\eta$, which are individually represented by equations 64-66 at the sample time N.

$$\Delta = a_{11N}a_{33N}a_{22N} - a_{33N}a_{12N}^2 - a_{13N}^2 a_{22N} + 2a_{13N}a_{12N}a_{23N} - a_{11N}a_{23N}^2 \tag{59}$$

$$\eta = \frac{-a_{11N}a_{23N}b_{3N} + a_{11N}a_{33N}b_{2N} + a_{12N}a_{13N}b_{3N} - a_{13N}^2 b_{2N} + a_{13N}a_{23N}b_{1N} - a_{12N}a_{33N}b_{1N}}{\max(\Delta, \Delta_{\min})} \tag{60}$$

$$\alpha = \frac{a_{12N}a_{23N}b_{3N} - a_{12N}a_{33N}b_{2N} + a_{13N}a_{23N}b_{2N} - a_{13N}a_{22N}b_{3N} + a_{22N}a_{33N}b_{1N} - a_{23N}^2 b_{1N}}{\max(\Delta, \Delta_{\min})} \tag{61}$$

-continued $$\beta = \frac{\begin{array}{c}-a_{31N}a_{22N}b_{1N} - a_{11N}a_{32N}b_{2N} + a_{11N}a_{22N}b_{3N} - \\ a_{12N}^2 b_{3N} + a_{12N}a_{13N}b_{2N} + a_{12N}a_{23N}b_{1N}\end{array}}{\max(\Delta, \Delta_{\min})} \quad (62)$$

Where $\Delta_{min}$ is a small positive value (e.g., 0.001) to avoid division by zero in the above computations.

In step 306, the determined parameters α, β, and η are compared with predetermined or known and associated nominal values $n_\alpha$, $n_\beta$, and $n_\eta$. When the roll damping parameter η is less than or greater than the nominal values by a predetermined threshold then an associated suspension damper irregularity is detected.

In step 308, a controller, such as the controller 26, may determine what is causing the irregularity and whether the irregularity can be overcome. Upon completion of step 308, step 310, step 312, or both steps 310 and step 312 may be performed.

In step 310, an active task is performed to counteract, for example, an irregular damping in the suspension. The irregular roll damping can cause the vehicle to have sustainable roll bouncing motion, which reduces the roll stability control performance. Hence as soon as a suspension damper irregularity is detected, additional brake pressure may be requested for the front outside wheel or additional brake pressure may be requested for the rear outside wheel. As another example, also to compensate for a reduced amount of damping associated with a wheel of the vehicle in a roll situation, using an active adjustable suspension, the damping to all wheels of the vehicle may be increased to stiffen the suspensions. In yet another example, to compensate for a reduced amount of damping associated with a wheel of the vehicle in a yaw situation, the front damping for the two front wheels may be increased or stiffened and the rear damping for the rear wheels may be reduced or softened. Of course, various other active tasks may be performed upon the detection of the suspension damper. As another example, the active action will be prioritized and/or arbitrated between the suspension irregularity and the roof loading.

When a severe suspension damper irregularity is detected (e.g., the detected roll damping value is substantially smaller than the nominal value), the vehicle driving speed may be limited by requesting the powertrain to provide limited engine power.

When a severe suspension damper irregularity is detected (e.g., the detected roll damping value is substantially smaller than the nominal value), the driver steering input may be limited through controllable steering devices, such as an electronic power steering system (EPAS) or an active front steering (AFS).

When severe suspension damper irregularity is detected (e.g., the detected roll damping value is substantially smaller than the nominal value), the driver cornering acceleration may be limited through a safety braking procedure. Notice that such a safety braking procedure is independent of the roll stability control function, which can be conducted before the occurrence of aggressive roll trending.

In step 312, the detected suspension damper irregularity is stored and may be displayed via an indicator or a vehicle display panel to warn the driver. The stored suspension damper irregularity info may also be accessed and reviewed by a vehicle technician for suspension damper repair.

While particular embodiments of the invention have been shown and described, numerous variations and alternate embodiments will occur to those skilled in the art. Accordingly, it is intended that the invention be limited only in terms of the appended claims.

What is claimed is:

1. A vehicle suspension system comprising:
    a suspension;
    a lateral acceleration sensor generating a lateral acceleration signal;
    a roll rate sensor generating a roll rate signal;
    a controller determining at least one of a roll gradient, a roll acceleration coefficient, and a roll damping parameter in response to said lateral acceleration and said roll rate signal, said controller detecting at least one irregularity in said suspension in response to a comparison of said roll gradient, said roll acceleration coefficient, and said roll damping parameter to nominal values associated therewith.

2. A system as in claim 1 wherein said controller in detecting at least one irregularity detects irregular damping in said suspension.

3. A system as in claim 1 wherein said controller adjusts brake pressure associated with at least one wheel of the vehicle in response to said at least one irregularity.

4. A system as in claim 1 wherein said controller adjusts steering angle of the vehicle in response to said at least one irregularity.

5. A system as in claim 1 wherein said controller adjusts engine power in response to said at least one irregularity.

6. A system as in claim 1 wherein said controller adjusts suspension system damping associated with at least one wheel of the vehicle in response to said at least one irregularity.

7. A suspension system for a vehicle comprising:
    a suspension;
    a lateral acceleration sensor generating a lateral acceleration signal;
    a roll rate sensor generating a roll rate signal;
    an active system; and
    a controller determining at least one of a roll gradient, a roll acceleration coefficient, and a roll damping parameter in response to said lateral acceleration and said roll rate signal, said controller detecting at least one irregularity in said suspension in response to a comparison of said roll gradient, said roll acceleration coefficient, and said roll damping parameter to nominal values associated therewith, said controller signaling said active system in response to said at least one irregularity.

8. A system as in claim 7 wherein said controller in detecting at least one irregularity detects a damping irregularity.

9. A system as in claim 8 wherein said controller in detecting a damping irregularity applies brake pressure to outside wheels of the vehicle.

10. A system as in claim 8 wherein said controller in detecting a damping irregularity increases damping for front and rear wheels of the vehicle.

11. A method of detecting suspension irregularities in a vehicle comprising:
    generating a lateral acceleration signal as an input to a controller;
    generating a roll rate signal as an input to a controller;
    determining roll angle in said controller using said lateral acceleration signal and said roll rate signal;
    determining a roll gradient, a roll acceleration coefficient, and a roll damping parameter in said controller using said roll angle;

comparing said roll gradient, said roll acceleration coefficient, and said roll damping parameter to associated nominal values in said controller; and indicating at least one suspension irregularity in response to said comparison.

12. A method as in claim 11 further comprising performing a task via an active system to compensate for at least one suspension irregularity as indicated by said controller.

13. A method as in claim 11 wherein indicating said suspension irregularity is a damping characteristic associated with at least one wheel of the vehicle.

14. A method as in claim 13 wherein said suspension irregularity is indicated to a vehicle operator.

15. A method as in claim 11 wherein determining said roll gradient, said roll acceleration coefficient, and said roll damping parameter comprises a least-squares method.

16. A method as in claim 11 wherein determining said roll gradient, said roll acceleration coefficient, and said roll damping parameter comprises a data averaging method.

17. A method as in claim 11 further comprising determining a cause of said at least one suspension irregularity.

* * * * *